(12) United States Patent
Kawaguchi et al.

(10) Patent No.: US 7,350,880 B2
(45) Date of Patent: Apr. 1, 2008

(54) ANTI-LOCK BRAKE SYSTEM FOR VEHICLES

(75) Inventors: Kiyoshi Kawaguchi, Tachikawa (JP); Nobuo Seko, Ise (JP); Tatsuo Itoh, Sagamihara (JP); Takashi Nagai, Itabashi (JP); Yoshiaki Okita, Shiso (JP); Hiroyasu Yamamoto, Ibo-gun (JP)

(73) Assignee: NEC Tokin Corporation (JP)

( * ) Notice: Subject to any disclaimer, the term of this patent is extended or adjusted under 35 U.S.C. 154(b) by 42 days.

(21) Appl. No.: 11/348,436

(22) Filed: Feb. 6, 2006

(65) Prior Publication Data

US 2006/0125316 A1 Jun. 15, 2006

Related U.S. Application Data

(62) Division of application No. 10/649,375, filed on Aug. 27, 2003, now Pat. No. 7,040,716.

(30) Foreign Application Priority Data

Aug. 29, 2002 (JP) ............................. 2002-251338
Mar. 31, 2003 (JP) ............................. 2003-094132
Mar. 31, 2003 (JP) ............................. 2003-094827

(51) Int. Cl.
*B60T 8/18* (2006.01)
(52) U.S. Cl. ..................... 303/22.6; 303/123
(58) Field of Classification Search .............. 303/3, 303/20, 152, 123, 22.1, 22.6
See application file for complete search history.

(56) References Cited

U.S. PATENT DOCUMENTS

| 3,757,818 | A | 9/1973 | Sweet |
| 3,858,606 | A | 1/1975 | Cameron |
| RE31,161 | E | 3/1983 | Mahorney |
| 5,388,025 | A | 2/1995 | Davis et al. |
| 5,419,620 | A * | 5/1995 | Keschwari-Rasti ............. 303/3 |
| 5,550,706 | A | 8/1996 | Kurzweil et al. |
| 5,627,438 | A * | 5/1997 | Barrett ....................... 318/139 |
| 6,604,547 | B1 | 8/2003 | Bento |
| 6,842,331 | B1 | 1/2005 | Kazaryan et al. |
| 7,054,139 | B2 | 5/2006 | James et al. |
| 2001/0019210 | A1* | 9/2001 | Fukasaku et al. ......... 290/40 C |

FOREIGN PATENT DOCUMENTS

| JP | 2000-108864 | 1/1998 |
| JP | 2000-003838 | 6/1998 |
| JP | 2002-050552 | 8/2000 |
| JP | 1994-054406 | 7/2002 |

OTHER PUBLICATIONS

Communication from U.S. Patent Office regarding corresponding application, Jul. 21, 2007.

* cited by examiner

*Primary Examiner*—Melanie Torres
(74) *Attorney, Agent, or Firm*—Harness, Dickey & Pierce, P.L.C.

(57) ABSTRACT

A high reliability and low power consumption anti-lock brake system is disclosed in the present invention. The two pilot valves in the present invention are controlled so as not to be energized concurrently. The secondary battery of the anti-lock brake system is charged by power supply and/or generator. An electric double layer capacitor comprising a housing made of functionally graded aluminum-ceramic material is used as the secondary battery.

17 Claims, 20 Drawing Sheets

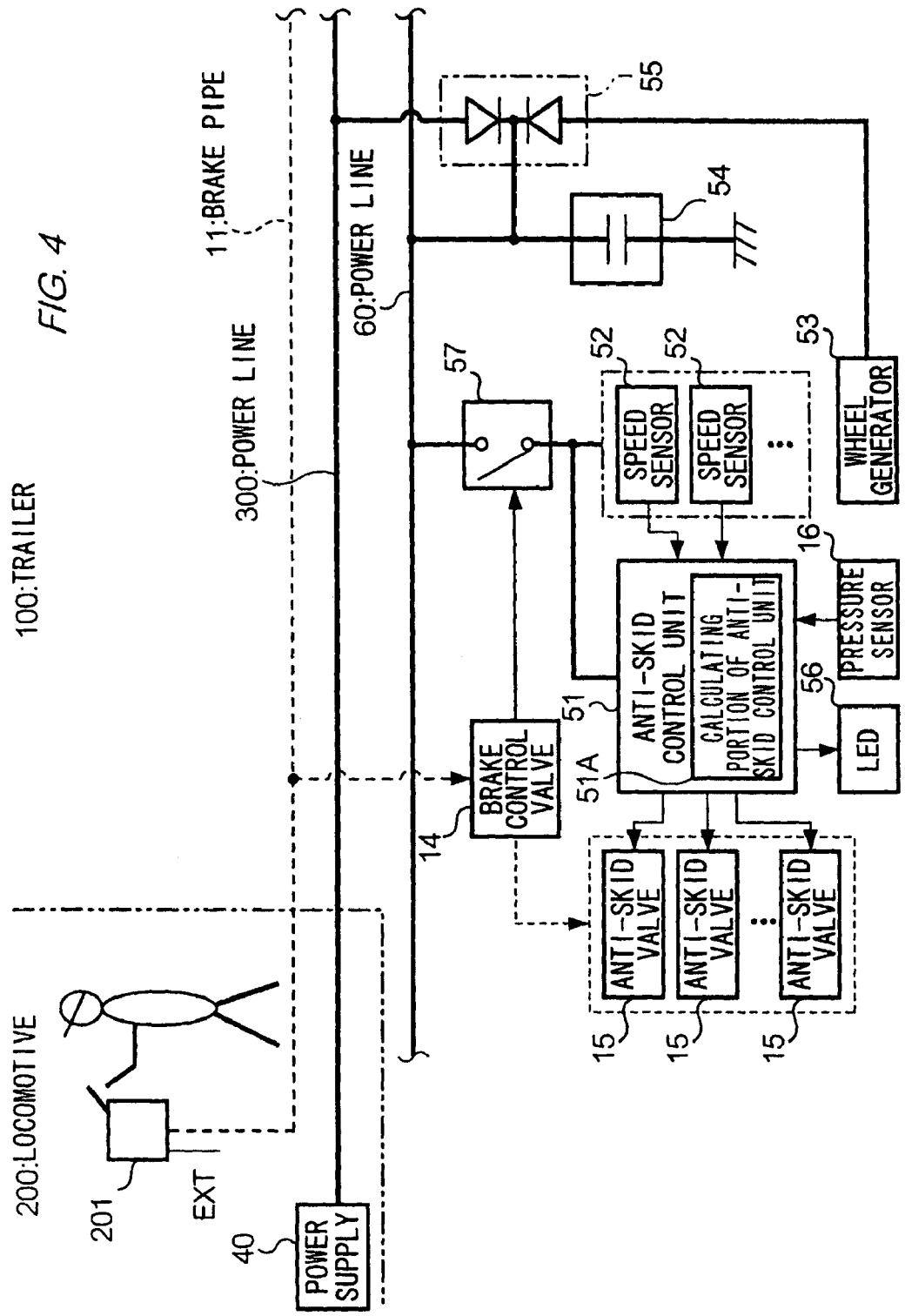

OUT ←

IN

EXH

OFF(RV)   ON(AV)

OUT ←

IN

EXH

OFF(RV)   OFF(AV)

ON(RV)   ON(AV)

ON(RV)   OFF(AV)

ANTI-SKID VALVE AND METHOD BY THE PRESENT INVENTION

ANTI-SKID VALVE AND METHOD BY PRIOR ART

ANTI-SKID VALVE BY THE PRESENT INVENTION AND METHOD BY PRIOR ART

PRIOR ART

FIG. 18
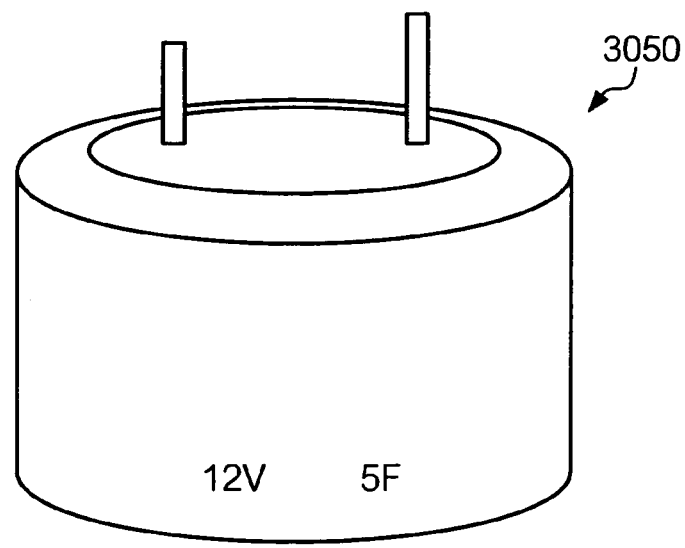
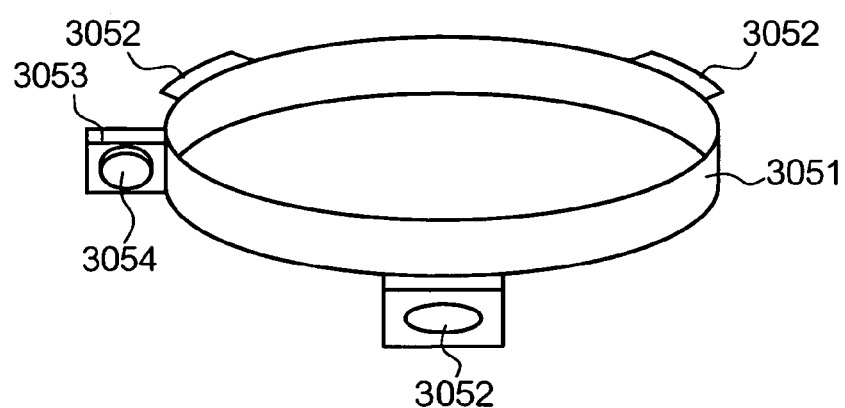
FIG. 19
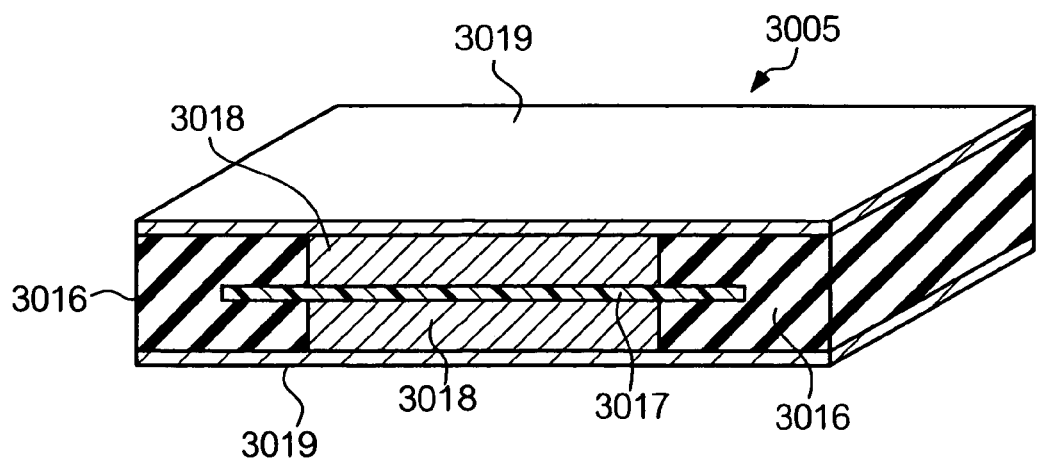

US 7,350,880 B2

ANTI-LOCK BRAKE SYSTEM FOR VEHICLES

RELATED APPLICATIONS

This application is a division of U.S. application Ser. No. 10/649,375 filed on Aug. 27, 2003 which claims priority to Japanese Application No. 2002-251338 filed, Aug. 29, 2002 and 2003-094132 filed Mar. 31, 2003. The disclosures of the above applications are incorporated herein by reference.

BACKGROUND OF INVENTION

1. Technical Field

The present invention relates to an anti-lock brake system (wheel slide protection) for vehicles. More specifically, the invention relates to an anti-lock brake system for trailers which can perform the function of intermittently relaxing a breaking force applied to the wheels of a trailer that is being hauled by an engine.

2. Background Art

Brake systems of railway vehicles generate a breaking force on the basis of a brake command originating at a motor-powered car, and the breaking force is applied to both the motor-powered car and to one or more trailers being hauled by the engine. In the art, different kinds of signals are used as commands in an air brake system, for example, a pneumatic signal by pressure variation in compressed air, an electric signal, and the concurrent use of pneumatic and electric signals, and so on.

These kinds of brake systems comprise an anti-skid system for intermittent relaxation of the breaking force applied to the wheels. The anti-skid system comprises a skid detecting unit, a brake cylinder, and an anti-skid valve. The skid detecting unit detects the skid of the wheel. The brake cylinder is pressurized by compressed air and generates a breaking force which is applied to the wheels. The anti-skid valve decreases a pressure of compressed air which is provided to the brake cylinder. The anti-skid valve has a function of relaxing the breaking force intermittently by controlling the pressure of compressed air in accordance with signals sent from the skid detecting unit.

Ordinarily, the anti-skid valve comprises at least one solenoid valve. A solenoid valve decreases the pressure of compressed air within the brake cylinder by using magnetic power generated by energizing solenoids.

FIG. 15A is a circuit diagram showing the configuration of the pneumatic circuit of the anti-skid valve disclosed in Japanese Patent document, JP 3209288 B. FIG. 15B is a circuit diagram showing the phases of the anti-skid valve in the prior art. As shown in FIG. 15A, the anti-skid valve in the prior art comprises two main valves and two pilot valves. One main valve is a normally-open, two-position, two-way valve and is referred to as "lockout valve" (lockout valve 2112A). The other main valve connected serially to the lockout valve is a normally-closed, two-position, two-way valve and is referred to as "release valve" (release valve 2112R). Both of the pilot valves (2111A and 2111R) are normally-closed, two-position, three-way solenoid valves and each one of the pilot valves functions as a pilot valve for a corresponding main valve. The anti-skid valve in the prior art is operated by a control method as shown in FIG. 14B. That is, both of the pilot valves are energized (FIG. 14B: region II and IV) in a case that the breaking force is relaxed. Then the lockout valve is closed and the release valve is opened. According to this operation, compressed air is not fed into the brake cylinder and the compressed air within the brake cylinder, which is released through the release valve is eventually exhausted. Thus the breaking force is relaxed. Also, the pilot valve of the lockout valve is energized and the pilot valve of the release valve is de-energized (FIG. 14B: region III and V) in a case that the breaking force is maintained. Similarly, both of the two pilot valves are de-energized (FIG. 14B: region VI) in a case that the breaking force is re-applied.

There are some disadvantages in the above described control method of the prior art. According to the control method in the prior art, it is necessary for both the pilot valves to be energized in the case that the function of relaxing the breaking force is performed. As a result the system consumes a large amount of power. Another disadvantage of the prior art is to do with all three ports of the anti-skid valve being connected to each other (this is referred to as "all ports open" phase). The "all ports open" phase occurs when the pilot valve of the lockout valve is de-energized and the pilot valve of the release valve is energized. This phase does not occur in the ordinary way, but may occur as a result of a malfunction of control circuit.

A power supply with a stable output voltage is required for operating the solenoid valves of the anti-lock brake system. However, it is difficult to obtain stable output voltage in trailers of railway vehicles. A brake system which comprises power supply (secondary battery) in the vehicle has been developed to overcome the problem. In the prior art, a generator, which generates power in response to the rotation of the wheels, is installed in the vehicle to charge the secondary battery without an external power supply.

As described above, the anti-skid valve consumes power continuously while the anti-lock brake system is in an anti-lock operation mode. Therefore, there is a possibility that the battery is over-discharged in a case that the vehicle has been in an anti-lock (anti-skid) operation state for more than a certain duration with a concomitant increase in power consumption which results in an increase of costs for running power converters or batteries in railway vehicles. Thus, a brake system with a low power consumption is required for railway vehicles with generators; railcars which travel through unelectrified regions; and hybrid motorcars driven by electric motors.

In the anti-lock brake system of the prior art, the secondary battery is charged by a generator which is installed in a vehicle. In this case, the secondary battery cannot be charged when the wheels are stopped because the generator cannot generate power when the wheels are stationary. Therefore, there is a possibility that the secondary battery becomes over-discharged in a case that the vehicle has been stationary with the secondary battery being over-discharged. When the vehicle starts rolling, the secondary battery is charged by the generator. However, the brake system cannot operate in a case that the remaining capacity of the second battery is not sufficient to operate the brake system.

As disclosed in Japanese Patent Application JP 2000-108864 A, a lead acid battery is conventionally used as a power supply for the brake system installed in a vehicle. Generally, the lead acid battery has many problems when used as a power supply for the brake system. Firstly, the lead acid battery has a short lifespan when used for charging/discharging. as well as a lower level of reliability. Secondly, it is necessary for a lead acid battery to be large in order to obtain the necessary characteristics for use as a power supply for the brake system because the ratio of its energy density to its power density is small. Thirdly, the capacity of the lead acid battery is affected by temperature, with a decrease in capacity as the temperature lowers.

The electric double layer capacitor is developed to overcome the above problems. FIG. 18 shows a perspective view of an electric double layer capacitor and its mounting hardware in a prior art. FIG. 20 is a sectional view of the capacitor unit cell of the electric double layer capacitor in the prior art. As shown in FIG. 18, the electric double layer capacitor for vehicles in a prior art comprises rondure capacitor unit 3050 and mounting hardware 3051 for mounting rondure capacitor unit 3050 on a vehicle. Mounting hardware 3051 is C-shaped and comprises two mounting portions 3053 on its two ends, which extend outwards. Mounting hardware 3051 also comprises three mounting portions 3052 which extend outwards, at positions by which the circle of the ring is divided into three equal parts. To mount the electric double layer capacitor in a prior art on a vehicle, at first, mounting hardware 3051 is carried on the circumference of rondure capacitor unit 3050, and then the capacitor unit is mounted using screws on a desired position of the vehicle through mounting portion 3053.

FIG. 20 shows the structure of the basic unit cell of the electric double layer capacitor in a prior art. As shown in FIG. 20, basic unit cell 3055 of rondure capacitor unit 3050 comprises a pair of electrodes 3058, separator 3057, a pair of collectors, and seal rubber 3056. More specifically, electrode 3058 comprises powdered activated carbon electrode and sulfuric acid solution electrolyte. Two electrodes 3058 face each other via separator 3057. Two collectors 3059 are located so as to sandwich two electrodes 3058, and the periphery of the two electrodes 3058 is sealed by seal rubber 3056.

FIG. 21 is a sectional view of the electric double layer capacitor in the prior art. As shown in FIG. 21, rondure capacitor unit 3050 is configured as follows. A plurality of basic unit cells 3055 is laminated parallel to the bottom of the case. Laminated unit cells 3055 are covered by a can case which has an opening on its upper side and two metal plates on its bottom. The edge of the opening is angled inwards to prevent the metal plate from dropping. Each metal plate has a lead terminal. The lead terminal of the positive electrode extends outwards via a through hole, which is made at the bottom of the insulated case. A boss is made at the edge of the through hole to prevent the metal plate of the positive electrode from coming into contact with the metal plate of the negative electrode. Similarly, the metal plate of the negative electrode also has a lead terminal which extends outwards.

For use as a power supply for vehicles, it is necessary that an electric double layer capacitor has the electronic characteristic of a high breakdown voltage. To obtain a high breakdown of voltage, aqueous electrolyte is preferable for the electrolyte of the electric double layer capacitor because it has the advantage of managing a serial connection. It is noted that a structure is necessary to carry out the function of pressing the capacitor from top to bottom.

Further, a more important characteristic of the electric double layer capacitor used as a power supply for vehicles is that the capacitor is resistant to adverse environmental conditions. Specifically, there exists the problems of degradation of electric or mechanical characteristics caused by (1) mechanical vibration of the vehicle when rolling, (2) wide range of temperature variation, or (3) pollution by contaminants. Different electric double layer capacitors are developed to overcome the problems. However, the structure disclosed in Japanese Patent Application JP 2000-3838 A has the problem of a low breakdown of voltage because the structure employs an organic electrolyte. Also the structure disclosed in Japanese Patent Application JP 2002-50552 A has the problem of vibration proof because it has no fixed structure of electrodes. Thus, electric double layer capacitors in the prior arts do not have the necessary capabilities for effective usage.

SUMMARY OF INVENTION

The object of the present invention is to overcome the disadvantages of the prior art by providing an anti-skid valve with a low power consumption, an electric double layer capacitor, and a high performance charging system for a power supply.

To solve the above problem, the present invention provides a three-way solenoid valve comprising: (1) a two-way valve comprising a first pilot valve whose operation mode is normally-open or normally-closed and a first main valve whose operation mode is different from the first pilot valve; and (2) a three-way valve connected serially to the two-way valve comprising a second pilot valve whose operation mode is normally-open or normally-closed and a second main valve whose operation mode is different from the second pilot valve.

The usage of the three-way solenoid valve as an anti-skid valve provides an anti-lock brake system, which does not have all ports in an open state. The usage of the three-way solenoid valve as an anti-skid valve also provides greater safety and is low in power consumption. Furthermore, the three-way solenoid valve can be operated by a conventional control system in the prior art.

The valve body of each of the first pilot valve, the first main valve, the second pilot valve, and the second main valve may be poppet type or spool type. The first pilot valve, the first main valve, the second pilot valve, and the second main valve may be housed in a single housing.

The present invention also provides an anti-lock brake system (wheel slide protection) for trailers hauled by a motor-powered car which comprises brake command output unit, comprising: (A) a breaking force generating unit for generating a breaking force to be applied to a plurality of wheels of a trailer; (B) an anti-skid valve for relaxing the breaking force generated by the breaking force generating unit; (C) a plurality of skid detection units, each skid detection unit detecting the skid of wheels on which the skid detection unit is installed, based on the signal from the wheel speed sensor; (D) an anti-skid brake system controller for outputting on the basis of a signal from the skid detection unit, a command to the anti-skid valve to relax the breaking force; (E) a secondary battery for providing electric power to the breaking force generating unit, the skid detection unit, and the anti-skid brake system controller; and (F) a generator for charging the secondary battery. The generator is installed on at least one of a plurality of wheels and generates power in response to the rotation of the wheel on which the generator is installed. The secondary battery is charged with power generated by the generator.

The above three-way valve may be used as the anti-skid valve. The generator may be a generator, which generates more power by increasing the rotational frequency of the wheel. The generator generates enough power to charge the secondary battery when the rotational frequency of the wheel exceeds a predetermined value. The anti-lock brake system may further comprise a power supply control unit for causing the secondary battery to provide power to the skid detection unit and the anti-skid brake system controller when the anti-lock brake system is in operation.

The secondary battery may be an electric double layer capacitor. The brake command may be transmitted by wired or wireless communication.

The anti-lock brake system in the present invention can prevent an anti-lock brake system from being in all ports with opened phases. The anti-lock brake system also provides safety and has an advantage of low power consumption.

The present invention also provides an electric double layer capacitor comprising (A) a laminated capacitor cell made by laminating a plurality of capacitor unit cells having two activated carbon powder electrodes and a sulfuric electrolyte, (B) a housing facility for housing the laminated capacitor cell, and (C) at least one mounting portion for mounting the electric double layer capacitor on another device, characterized in that, the housing is made of functionally graded aluminum ceramic material; and the mounting portion and the housing are formed in one piece.

The electric double layer capacitor in the present invention provides high resistance to surface exfoliation because its lead portion and mounting portion are made separately. The electric double layer capacitor in the present invention can be used in a wide temperature range because it employs aqueous (sulfuric) electrolyte instead of conventional organic electrolyte. In the prior art, a thick metal case is used for preventing contamination and for appropriate pressurizing, which requires a high breakdown of voltage and a large capacity without which a problem of internal heating can occur. Further, the heat radiation of the capacitor unit is not sufficient because the thick metal case is insulated from the electrodes by plastics. The present invention proposes to resolve the problem by using functionally graded metal (aluminum)—ceramic material for constructing the housing (case).

The housing may have a rectangular parallelepiped shape. A plurality of mounting portions may be installed at the bottom of the housing. The mounting portions and the housing may be formed in one piece. The plurality of mounting portions may be installed in a zigzag pattern or may be randomly dispersed. The housing may be electrically insulated from the electrodes. The electrodes may be located at one plane of the housing.

The plurality of capacitor unit cells may be serially connected to each other through electricity. The per housing output voltage of the laminated capacitor cell may be in the range of 15-60 V DC. The per housing capacity of the laminated capacitor cell may be in the range of 1-100 F.

In the anti-lock brake system according to the present invention, the usage of the electric double layer capacitor for power supply installed in each vehicle can prevent overdischarge of the power supply because the charge/discharge capacity is large, and has a long life.

The present invention provides an anti-lock brake system, which is characterized by high safety, high reliability, and low power consumption.

BRIEF DESCRIPTION OF THE DRAWINGS

FIG. 4 is a block diagram illustrating the configuration of the electric system in the anti-lock brake system for trailers in accordance with the first embodiment of the present invention.

FIG. 18 is a perspective view of the electric double layer capacitor and its mounting hardware in accordance with the prior art.

FIG. 19 is a sectional view of the basic capacitor unit cell of the electric double layer capacitor in accordance with the present invention.

BEST MODE FOR CARRYING OUT THE INVENTION

The preferred embodiment of the present invention will be described with reference to the above-described figures.

A. First Embodiment

A-1. Configuration of the Anti-Lock Brake System for Trailers

Figure 1:
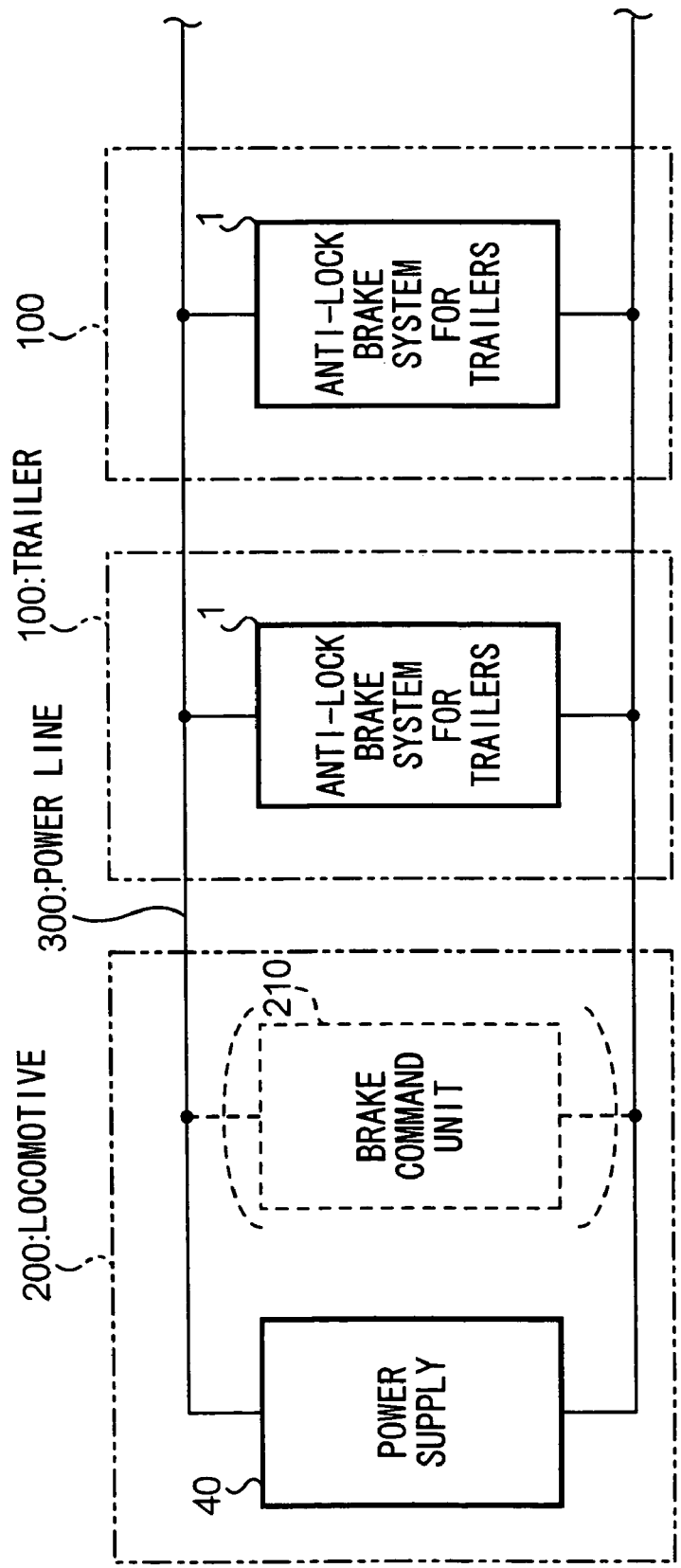
FIG. 1 is a schematic diagram of the configuration of railway vehicles comprising the anti-lock brake system for trailers in accordance with the first embodiment of the present invention.

FIG. 1 is a schematic diagram of the configuration of the railway vehicles comprising the anti-lock brake system for trailers in accordance with the first embodiment of the present invention. As shown in FIG. 1, the railway vehicles comprise locomotive 200 and a plurality of freight cars 100. Freight car 100 is a trailer comprising anti-lock brake system 1. Locomotive 200 is a motor-powered car, which hauls freight cars 100.

Locomotive 200 comprises power supply 40 whose output voltage is 100 V DC. Power supply 40 provides power via power line 300 to the anti-lock brake system for trailers installed in each freight car 100.

Figure 2:
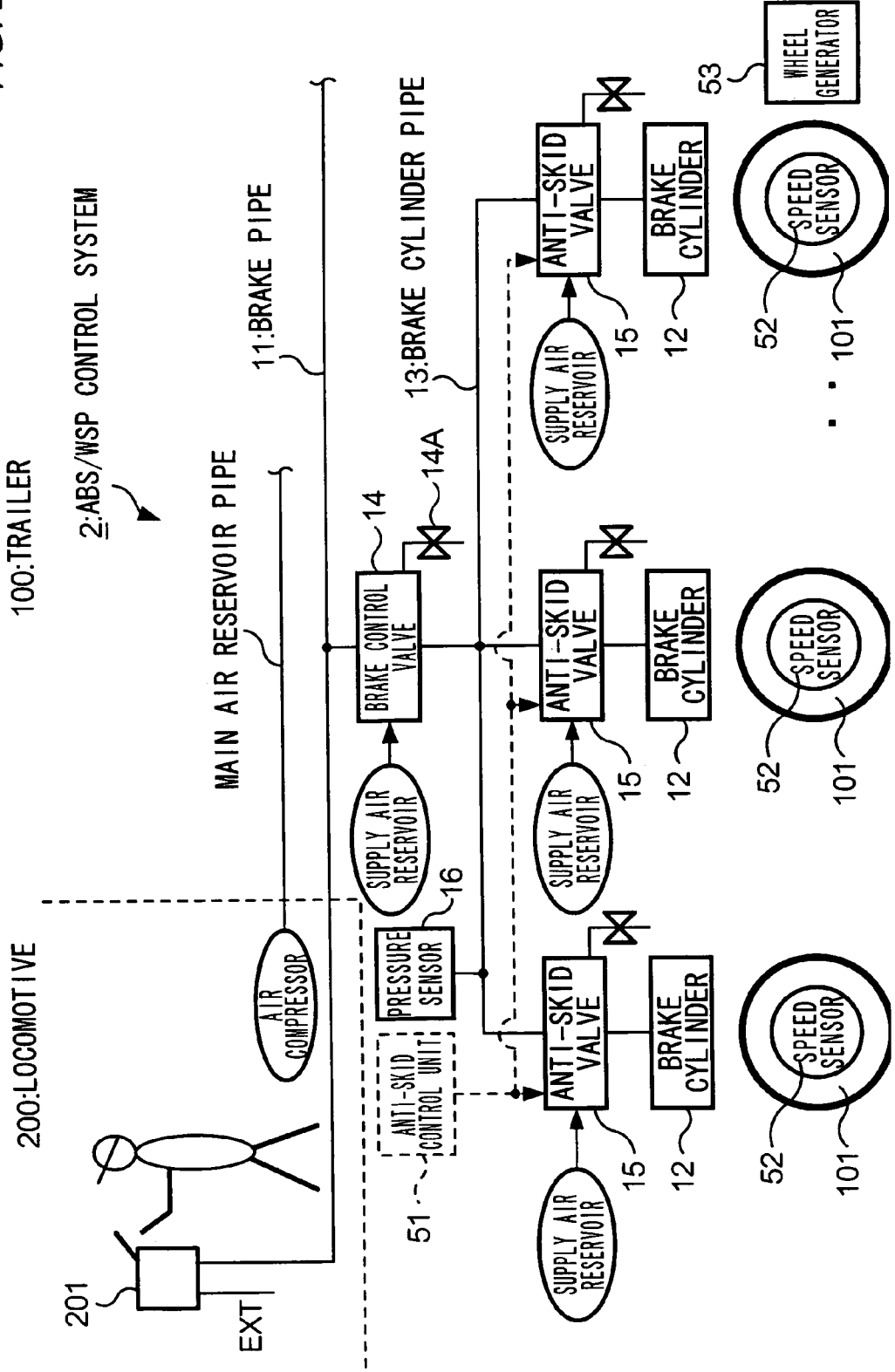
FIG. 2 is a block diagram showing the configuration of the pneumatic system in the anti-lock brake system for trailers in accordance with the first embodiment of the present invention.

FIG. 2 is a block diagram showing the configuration of the pneumatic system in the anti-lock brake system 1 for trailers in accordance with the first embodiment of the present invention. As shown in FIG. 2, locomotive 200 comprises brake valve 201 by which an engine driver can control the speed of the railway vehicle. Brake valve 201 generates a pneumatic signal as a brake command for each of the anti-lock brake systems 1 for trailers in freight car 100, in response to the operation of the engine driver. Specifically, the pneumatic signal for a brake command is generated as follows. That is, brake valve 201 depressurizes brake pipe 11 by exhausting the compressed air in brake pipe 11. The brake command is transmitted to the anti-lock brake system 1 for trailers via brake pipe 11 installed in the trailers.

Following is an example of an air command automatic air brake system as described in the first embodiment. The air command automatic air brake system is a brake system, which uses a pneumatic signal for a brake command. A pneumatic signal is a signal using pressure variation in compressed air. The brake command is transmitted to the anti-lock brake system 1 for trailers via brake pipe 11 installed in the trailers.

The anti-lock brake system 1 for trailers comprises a pneumatic system and an electric system. These will be described below.

A-1-1. Pneumatic System of the Anti-Lock Brake System 1 for Trailers

Figure 3:
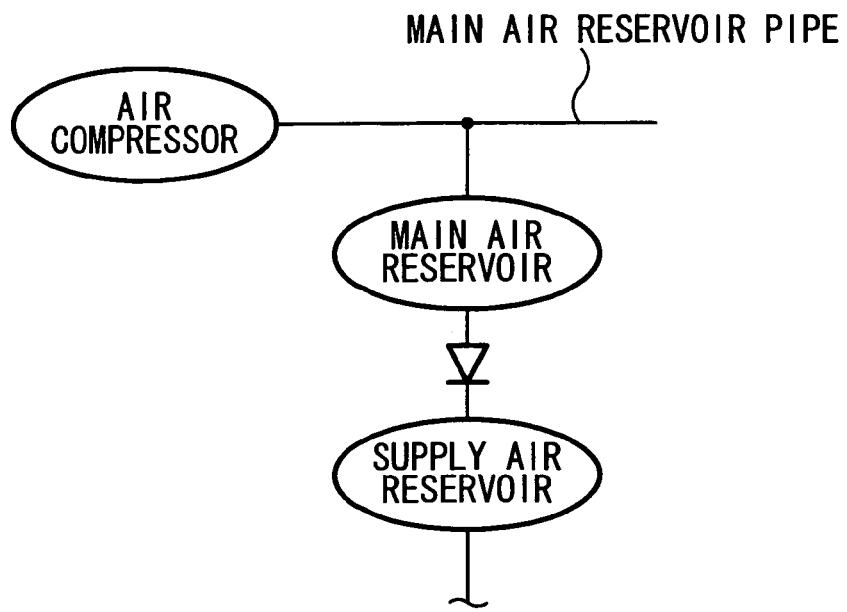
FIG. 3 is a block diagram illustrating the pressure source (air reservoir) in the anti-lock brake system for trailers in accordance with the first embodiment of the present invention.

Prior to the description of the pneumatic system, an air reservoir will be described with reference to FIG. 3. The air reservoir comprises main air reservoir MR and supply air reservoir SR. The air reservoir reserves compressed air. The compressed air is compressed by an air compressor installed in locomotive 200 and is fed to the air reservoir.

The pneumatic system of the anti-lock brake system 1 for trailers will be described with reference to FIG. 2. FIG. 2 is a block diagram showing the configuration of the pneumatic system in the anti-lock brake system for trailers in accordance with the first embodiment of the present invention. Namely, FIG. 2 shows the configuration of ABS (anti-lock brake system)/WSP (wheel slide protection) control system 2. ABS/WSP control system 2 generates and applies breaking force to a plurality of (e.g. eight) wheels 101 of freight car 100.

As shown in FIG. 2, ABS/WSP control system 2 comprises brake pipe 11 for transferring the brake command from locomotive 200 to brake cylinder 12 installed at wheels 101, brake cylinder pipe 13 installed between brake pipe 11 and brake cylinder 12, brake control valve 14 installed between brake pipe 11 and brake cylinder pipe 13, and anti-skid valve 15 installed between brake control valve 14 and brake cylinder 12. Furthermore, pressure sensor 16 is installed at brake cylinder pipe 13.

The inlet port of brake control valve 14 is connected to air reservoir SR/MR, the outlet port of brake control valve 14 is connected to brake cylinder pipe 13, and the exhaust port is released into the atmosphere via a restrictor.

Brake control valve 14 is a proportional valve. When the pressure within brake pipe 11 is decreased, brake control valve 14 causes the pressure within brake cylinder pipe 13 to increase by feeding compressed air from air reservoir SR/MR to brake cylinder pipe 13. Similarly, when the pressure within brake pipe 11 is increased to a predetermined value (490 kPa), brake control valve 14 causes the pressure within brake cylinder pipe 13 to decrease by exhausting compressed air within brake cylinder pipe 13.

As described above, brake control valve 14 can detect the brake command by monitoring the pressure within brake pipe 11. Brake control valve 14 can increase the pressure within brake cylinder pipe 13 in proportion to the decreased amount of pressure within brake pipe 11

The configuration of anti-skid valve 15 will be described in detail later.

Pressure sensor 16 is able to perform the function of generating a brake signal by monitoring the pressure within brake cylinder pipe 13. It can be recognized that some fault, e.g. air leakage from brake pipe 11 occurs when increase of the pressure within brake cylinder pipe 13 is detected even when no brake command has been generated by brake valve 201. It is to be noted that pressure sensor 16 is optional.

Pressure sensor 16 is able to perform the function of detecting the increase of pressure within brake cylinder pipe 13. Also, Pressure sensor 16 may transmit a brake command to anti-skid control unit in the instance that Pressure sensor 16 is a means for transmitting the brake command to anti-skid control unit 51

Then, the relation between pressure and breaking force in brake pipe 11 and brake cylinder pipe 13 will be described.

In a case that the brake is not operated, the pressure within brake pipe 11 is kept to 5 kgf/cm$^2$ ($\approx$490 kPa) and the pressure within brake cylinder pipe 13 is kept to 0 kgf/cm$^2$ (=0 kPa). When the brake is operated, compressed air within brake pipe 11 is released into the atmosphere in response to the operation of brake valve 201. Thus, the pressure within brake pipe 11 decreases and the compressed air is fed into brake cylinder pipe 13 in proportion to the increased amplification function of brake control valve 14.

In the case that the brake is operated (that is, breaking force is applied to wheels 101), anti-skid valve 15 operates under a specific condition. According to the operation of anti-skid valve 15, the breaking force can be relaxed by the release of compressed air within brake cylinder 12 when wheel 101 is skidded. Further, by stopping the release of compressed air in the case that a predetermined condition is satisfied, the breaking force can be maintained. By repeating the anti-lock operation the breaking force at wheels 101 can be relaxed intermittently.

A-1-2. Electric System of Anti-Lock Brake System 1 for Trailers

Next, the electric system of anti-lock brake system 1 for trailers will be described. FIG. 4 is a block diagram illustrating the configuration of the electric system in the anti-lock brake system 1 for trailers in accordance with the first embodiment of the present invention. In FIG. 4, the bold line represents the power line, the thin line represents the signal line, and the dotted line stands for the pneumatic line.

The electric circuit of anti-lock brake system 1 for trailers comprises anti-skid control unit 51, wheel speed sensor 52, wheel generator 53, electric double layer capacitor 54 as a secondary battery, and current direction defining circuit 55. Power line 60 is installed in freight car 100 for providing electric power from electric double layer capacitor 54 to anti-lock brake system 1 for trailers.

In the present embodiment, the power supply unit comprises power line 300, wheel generator 53, current direction defining circuit 55, and electric double layer capacitor 54.

Anti-skid control unit 51 comprises a microcomputer comprising a CPU, RAM, and ROM (all of which are not shown in the figures). Pressure sensor 16 and a plurality of wheel speed sensors 52 are connected to the input port of anti-skid control unit 51. Anti-skid valve 15 and LED 56 are connected to the output port of anti-skid control unit 51. Programs and parameters for anti-skid operation are stored in the ROM of anti-skid control unit 51. Brake control valve 14 outputs an electric brake signal to switch 57 while the brake system is operating. Power is supplied through power line 60 to anti-skid control unit 51 by switching on switch 57, and then anti-skid control unit 51 begins to operate. Anti-skid control unit 51 performs the anti-skid operation, which will be described in detail later. In anti-skid operation, calculating portion 51A of anti-skid control unit 51 determines on the basis of the wheel speed measured by wheel speed sensor 52 installed at each axle (not shown in the figures) whether wheel 101 is skidding, and then an anti-skid signal is outputted to each wheel 101.

Pressure sensor 16 transmits a signal to anti-skid control unit 51 when an air-leak occurs, and anti-skid control unit 51 is able to detect the air-leak by means of the signal. Further, when the brake system is in operation, the pressure within brake cylinder pipe 13 must be maintained at a high level by means of compressed air being fed from air reservoir SR/MR via brake control valve 14. Thus, anti-skid control unit 51 can detect an air-leak when the signal from pressure sensor 16 is a signal showing that the pressure is low, then it is notified by turning on LED 56.

Wheel generator 53 is a generator which is installed at the edge of wheel 101, and is a generator which generates electric power in response to the speed of rotation of wheel 101 in accordance with the electromagnetic induction of a permanent magnet and a stator/rotor.

Electric double layer capacitor 54 is used as a power supply for anti-skid control unit 51. Electric double layer capacitor 54 has an advantage over conventional lead acid batteries because of its greater efficiency in performing the charging/discharging functions, and its long life.

As power supply 40 provides a constant power supply to electric double layer capacitor 54 through power line 300, a case of over-discharge of electric double layer capacitor 54 can be prevented even when the power consumption by electric double layer capacitor 54 is high. Furthermore, in the present invention, electric double layer capacitor 54 uses a sulfuric solution as an electrolyte, unlike a conventional electric double layer capacitor that uses organic solution as an electrolyte, and is therefore, capable of a low capacitance reduction at a lower temperature and has a long life. Additionally, electric double layer capacitor 54 is more resistant to degradation, than conventional electric double layer capacitors when a high power consuming operation of momentarily turning on and off of a device is carried out repeatedly. Therefore, it is preferable to use electric double layer capacitor 54 as a power supply for anti-lock brake system 1 for trailers, in which the anti-skid operation of momentary charge/discharge is carried out repeatedly. Moreover, electric double layer capacitor 54 can cut running costs including that for maintenance, compared with a conventional large capacity battery such as a lead acid battery which depends on chemical reaction.

Current direction defining circuit 55 is a circuit for determining the direction of current through power line 300 and from wheel generator 53. Namely, it is a circuit which prevents current from flowing in both directions between power line 300 and wheel generator 53, when electric double layer capacitor 54 is being charged.

Following is a description of the two methods used for charging electric double layer capacitor 54.

(1) Electric double layer capacitor 54 can be charged by wheel generator 53, and when the speed of wheel 101 is high enough to charge electric double layer capacitor 54, electric double layered capacitor can also be charged by power supply 40 via power line 300.

(2) However, in a case that the speed of wheel 101 is not sufficient (or when wheel 101 is stationary) to charge electric double layer capacitor 54 electric double layer can be charged by power supply 40 via power line 300 alone. Conversely, power supply 40 may be decreased and electric double layer capacitor 54 can be charged by wheel generator 53 alone if necessary.

A-1-3. Configuration of Anti-Skid Valve

Figure 9A:
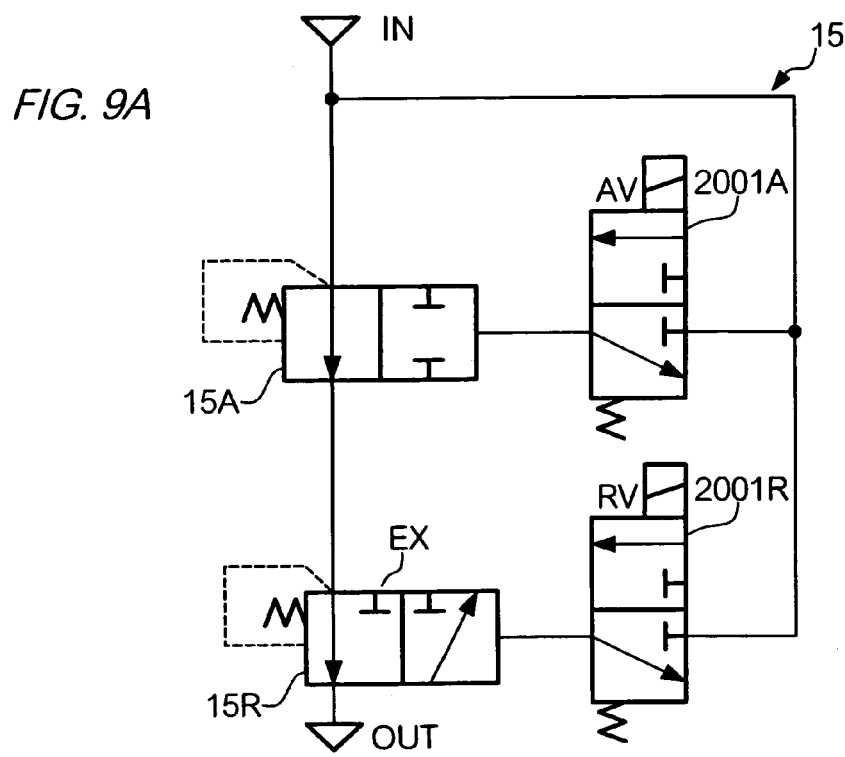
FIG. 9A is a circuit diagram of a pneumatic circuit of the anti-skid valve in the anti-lock brake system for trailers in accordance with the present invention.

The anti-skid valve of the anti-lock brake system in the present invention will be described in this section. FIG. 9A is a circuit diagram of a pneumatic circuit of the anti-skid valve in the anti-lock brake system for trailers in accordance with the present invention. As shown in FIG. 9A, anti-skid valve 15 comprises: two main valves (lockout valve 15A and release valve 15R); and two pilot solenoid valves (2001R and 2001A). Each pilot valve is a valve for outputting a pneumatic signal for controlling one of the main valves in response to the electric signal from anti-skid control unit 51.

Each main valve is a valve for controlling the compressed air flow in response to the pneumatic signal from the pilot valve.

The main valve of lockout valve 15A is a normally-open, two-position, two-way pneumatic valve which connects its inlet port and outlet port when the inputted pneumatic signal is an OFF signal (low pressure). The main valve of release valve 15R is a normally-open, two-position, three-way pneumatic valve which connects its inlet port and outlet port when the inputted pneumatic signal is an OFF signal. Each pilot valve is a normally-closed, two-position, three-way solenoid valve. Each pilot valve connects its outlet port and exhaust port when it is de-energized, and connects its inlet port and outlet port when it is energized. Each inlet port of two pilot valves is connected to brake cylinder pipe 13. The output valves are connected to the pilot signal receiver of lockout valve 15A and release valve 15R, respectively. The inlet port of the main valve of lockout valve 15A is connected to brake cylinder pipe 13, and the outlet port of the main valve of lockout valve 15A is connected to the inlet port of the main valve of release valve 15R. The outlet port of release valve 15R is connected to brake cylinder 12, and the exhaust port of release valve 15R has an external opening.

In the present embodiment, each main valve of lockout valve 15A and release valve 15R is a poppet valve. In the present invention, each of lockout valve 15A and release valve 15R is a pneumatic solenoid valve which has no external piping and has a single housing, although the anti-skid valve of the present invention is not restricted to the above described embodiment. At least one of main valves of lockout valve 15A and release valve 15R may be a spool valve.

The anti-skid valve in the present invention will be described in detail below with reference to FIG. 9-14C.

As shown in FIG. 9A, anti-skid valve 15 comprises: two pneumatic valves which function as lockout valve 15A and release valve 15R; and two solenoid valves which function as a pilot valve of lockout valve 15A and release valve 15R.

Figure 10A:
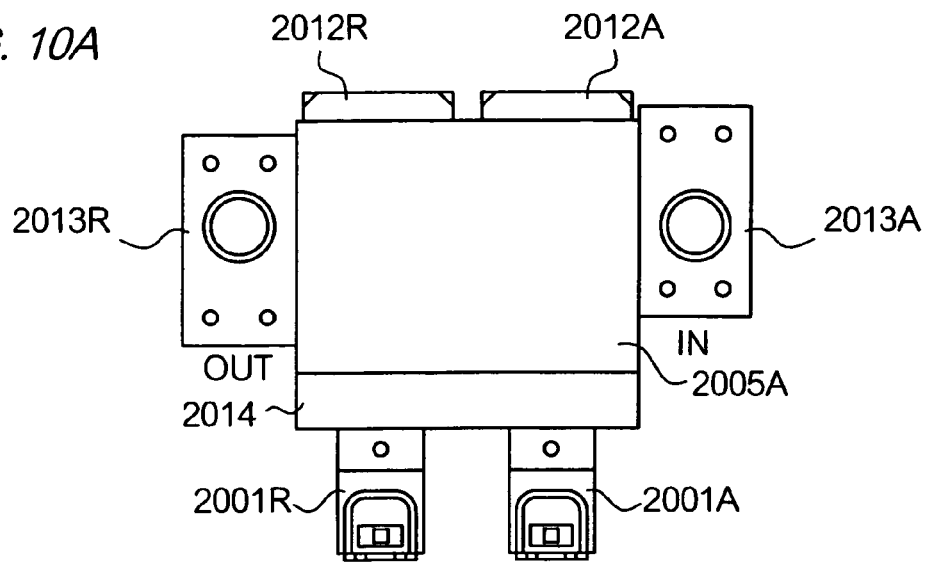
FIG. 10A shows a front view of the anti-skid valve in accordance with the present invention.
Figure 10B:
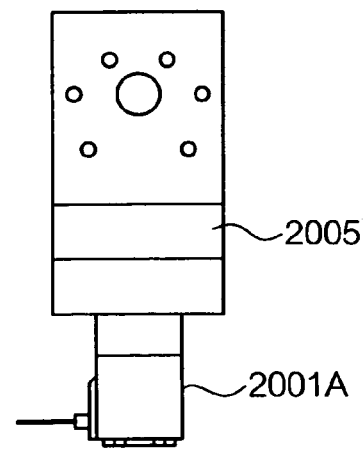
FIG. 10B shows a side view of the anti-skid valve in accordance with the present invention.
Figure 10C:
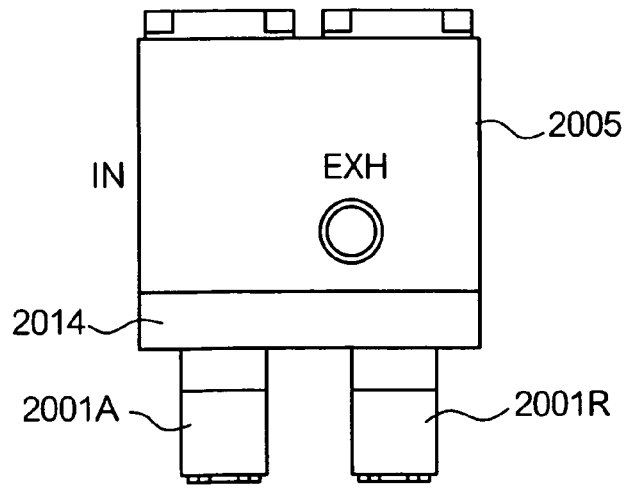
FIG. 10C shows a back view of the anti-skid valve in accordance with the present invention.
Figure 11:
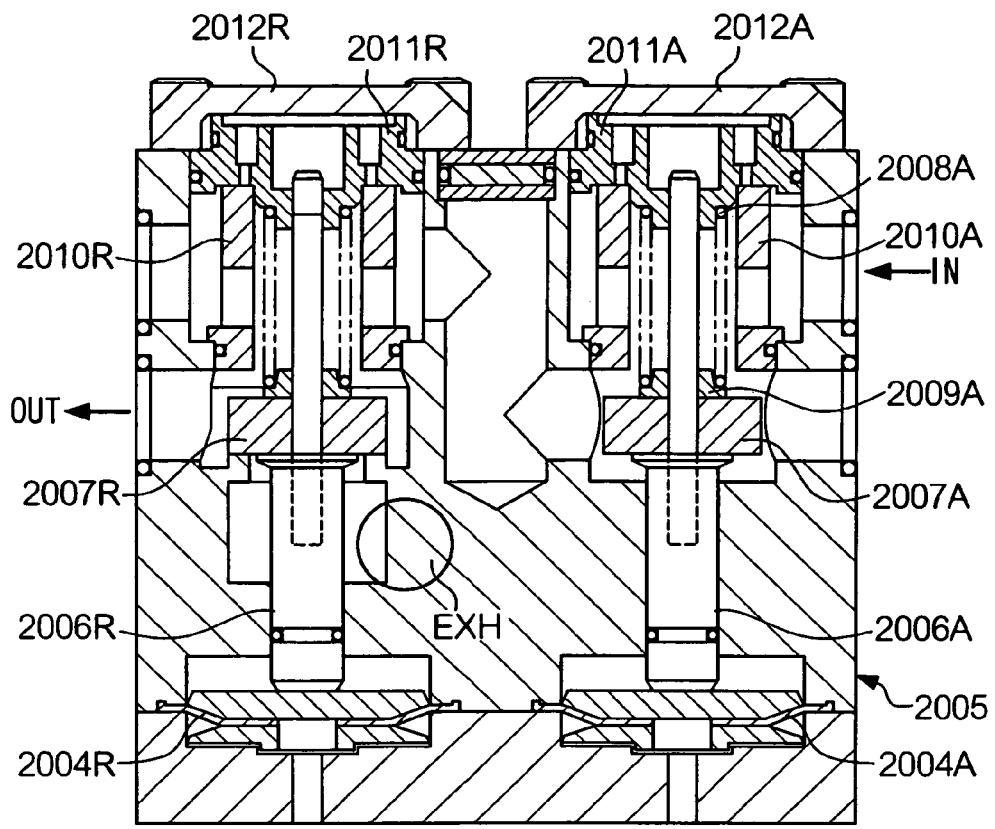
FIG. 11 is a sectional view of the anti-skid valve in accordance with the present invention.

FIG. 10 shows a front view (FIG. 10A), a side view (FIG. 10B), and a back view (FIG. 10C) of the anti-skid valve in accordance with the present invention. As shown in FIG. 10, the anti-skid valve comprises: pilot solenoid valve 2001R and 2001A; valve housing 2005; flange 2013R and 2013A; and bonnet 2014. FIG. 11 is a sectional view of the anti-skid valve in accordance with the present invention. As shown in FIG. 11, each of the pneumatic valves is a valve comprising a diaphragm actuator and an air-bag valve. The pneumatic valves have valve housing 2005 including a pair of diaphragms 2004R and 2004A. A pair of pilot solenoid valves 2001R and 2001A is installed underneath bonnet 2014 (see FIG. 10A through FIG. 10C) in correspondence with diaphragm 2004R and 2004A. As shown in FIG. 11, valve housing 2005 comprises: rod cap 2006R and 2006A engaged with diaphragm 2004R and 2004A; and valve body 2007R and 2007A installed above rod cap 2006R and 2006A. Anti-skid valve 15 comprises: spring 2008R and 2008A; spring holder 2009R and 2009A for holding spring 2008R and 2008A; and valve sheet 2010R and 2010A for covering spring 2008R and 2008A. Plug 2011R and 2011A are installed above anti-skid valve 15 and covered with cover 2012R and 2012A.

The anti-skid valve in the present invention has the configuration described above, and generally operates as follows. Each of the two pilot valves outputs pneumatic signals in response to the electric signal from anti-skid control unit 51, to two pneumatic valves which function as main valve of lockout valve 15A and release valve 15R, respectively. Each of the two pneumatic valves is opened/closed in response to the pneumatic signal. Anti-skid valve 15 can apply, relax, and maintain the breaking force in accordance with varying combinations of opened/closed state of lockout valve 15A and release valve 15R.

It is noted that either or both of the pilot valves and the main valves in the present invention may be a spool valve or a poppet valve as circumstances demand. These valves are preferable for the anti-skid valve because they can prevent partial wear caused by vibration of the vehicles.

A-1-4. Configuration of Electric Double Layer Capacitor

Figure 16:
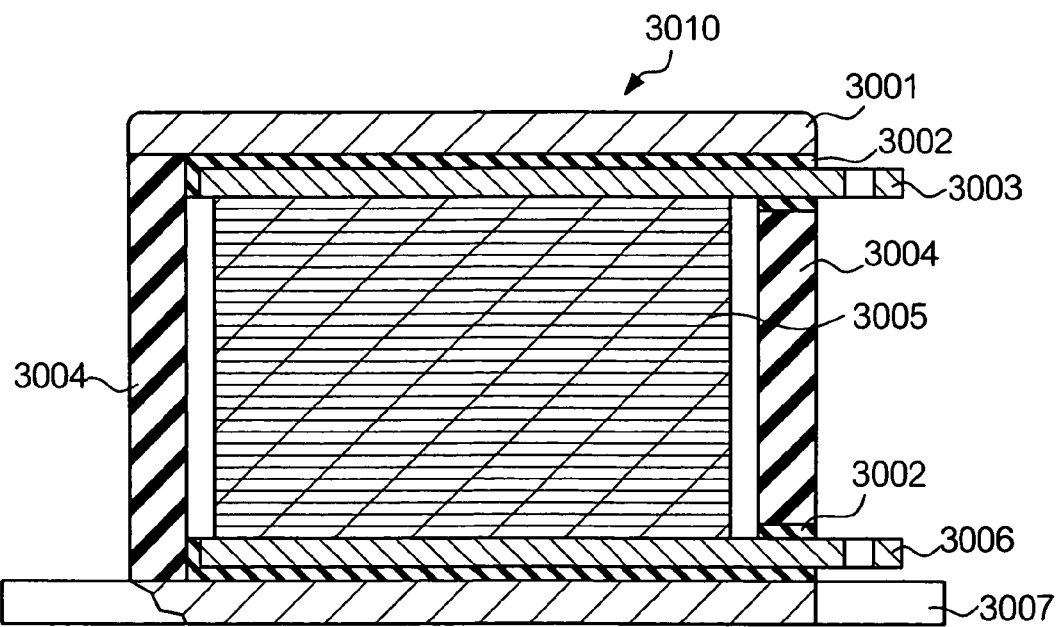
FIG. 16 is a sectional view of the electric double layer capacitor in accordance with the present invention.
Figure 12A:
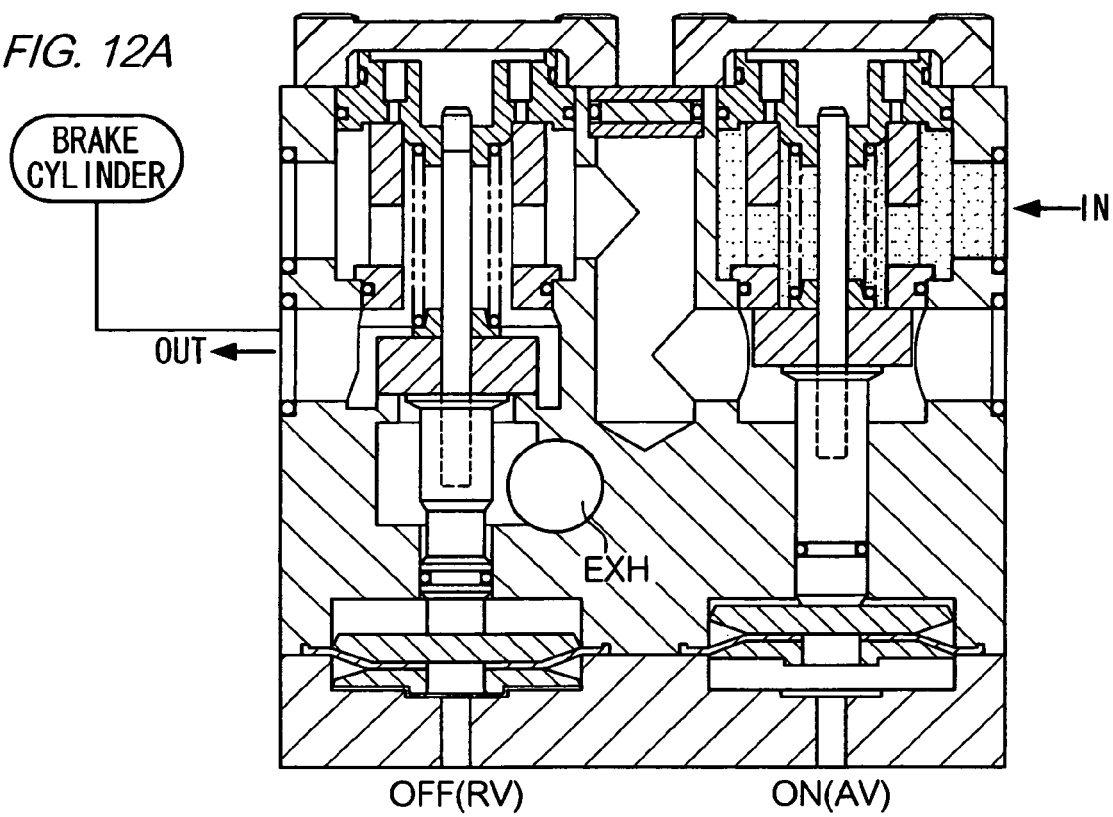
FIG. 12 is a schematic diagram showing the airflow of the anti-skid valve in operation in accordance with the present invention.
Figure 12B:
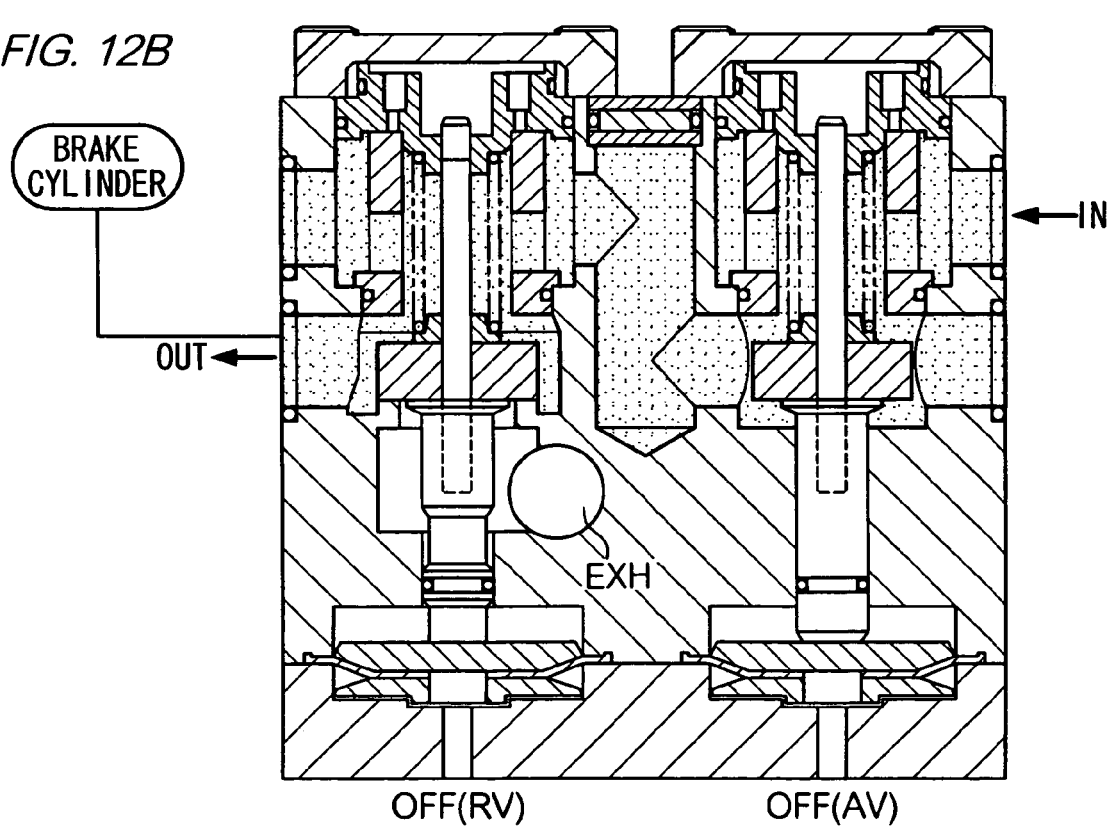
Figure 17A:
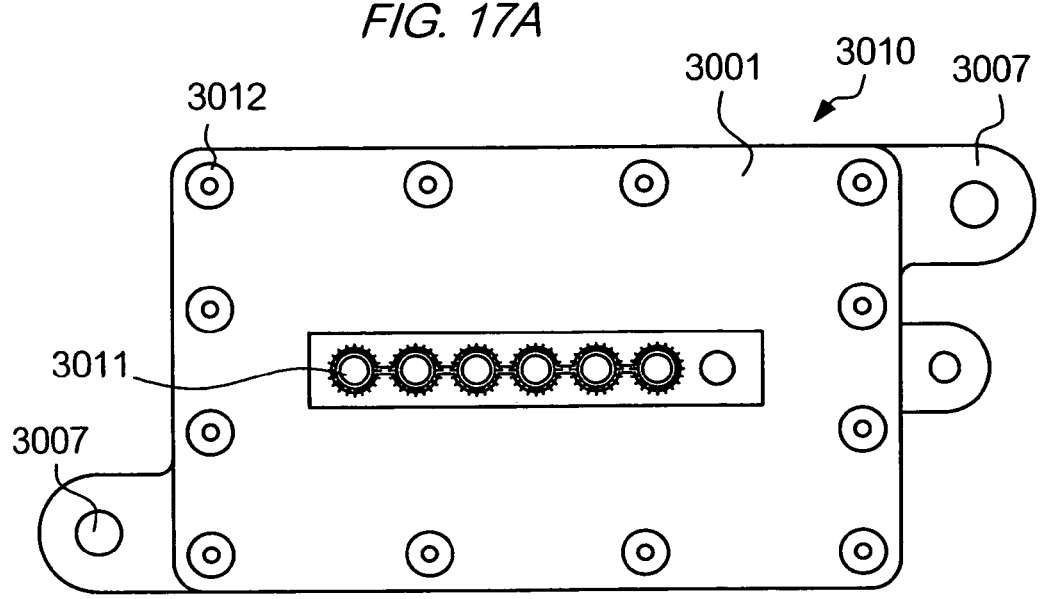
FIG. 17A is a plane view of the electric double layer capacitor for railway vehicles in accordance with the present invention.
Figure 17B:
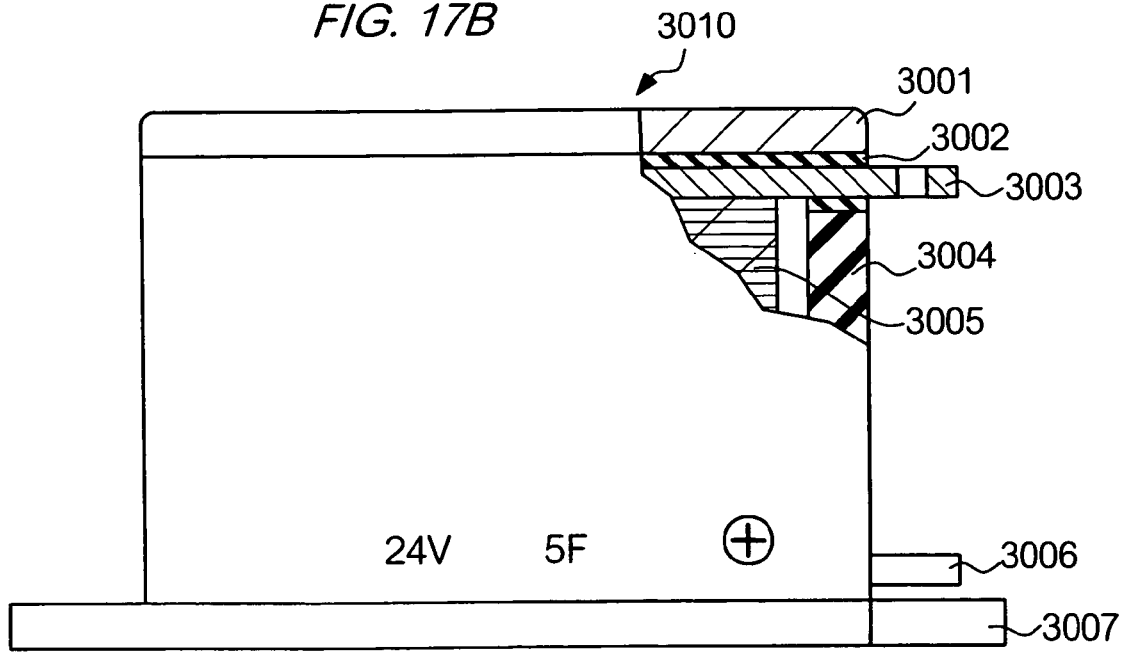
FIG. 17B is a local sectional view of the electric double layer capacitor for railway vehicles in accordance with the present invention.
Figure 20:
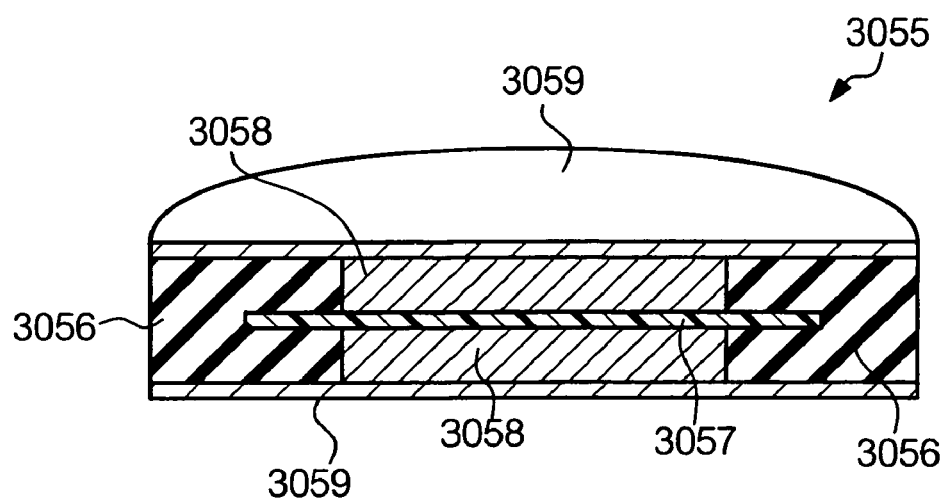
FIG. 20 is a sectional view of the basic capacitor unit cell of the electric double layer capacitor in accordance with the prior art.
Figure 21:
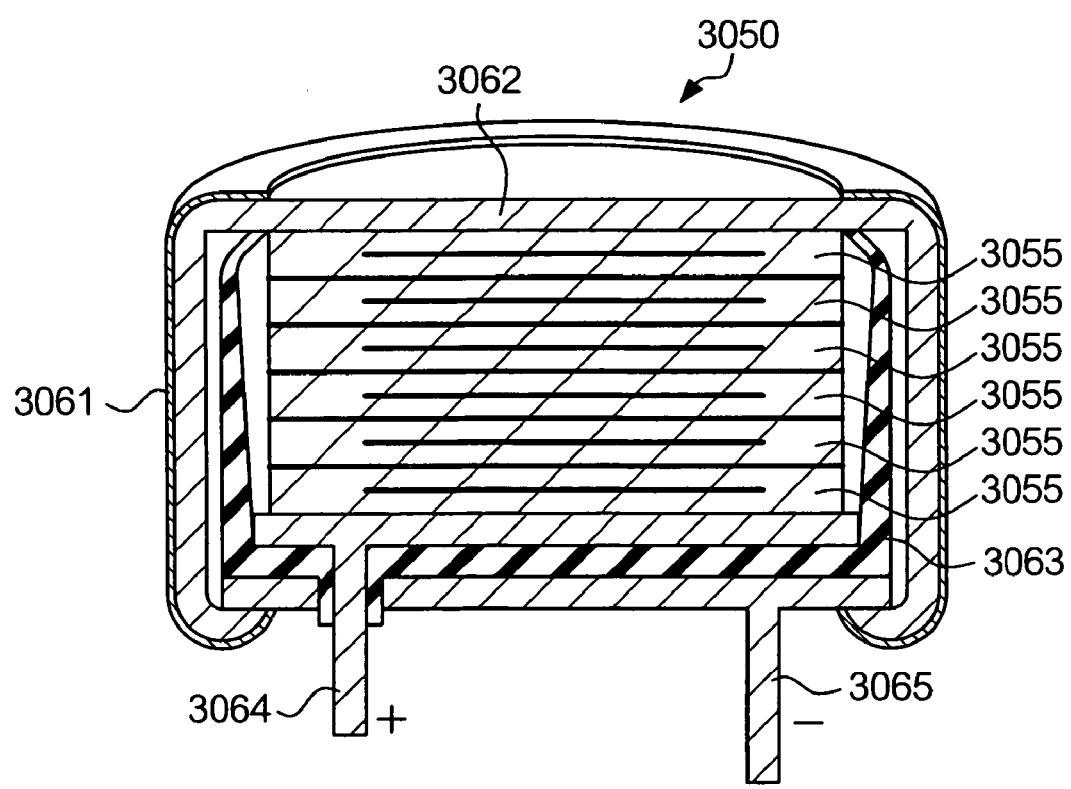
FIG. 21 is a sectional view of the electric double layer capacitor in accordance with the prior art.

The electric double layer capacitor in the present embodiment will be described in this section. FIG. 16 shows a sectional view of the electric double layer capacitor in accordance with the present invention. FIG. 17 shows a plane view (FIG. 17A) and a local sectional view (FIG. 17B) of the electric double layer capacitor for railway vehicles in accordance with the present invention.

As shown in FIGS. 16 and 17, the electric double layer capacitor for vehicles in the present invention comprises upper plate 3001, insulator plate 3002, capacitor housing 3004, negative electrode 3003, positive electrode 3006, laminated capacitor cell 3005, and mounting portion 3007. Upper plate 3001, capacitor housing 3004, and mounting portion 3007 are made of functionally graded metal (aluminum)-ceramic material. Here, functionally graded material refers to a material whose characteristic (function) in one part is gradually different from that in another part of the material of a single object. Namely, functionally graded material is material whose characteristics are varied within the same material constituting the whole body of an object. Functionally graded metal-ceramic material, especially functionally graded aluminum-ceramic material refers to a material which has aluminum component and ceramic component and whose ceramic composition is varied in accordance with the region of the material. For example, in a box-shaped functionally graded aluminum-ceramic material, the aluminum composition is graded to be higher on the outer side and lower on the inner side than the ceramic composition, or conversely the ceramic composition may be graded to be higher on the outer side and lower on the inner side than the aluminum composition. Another example of use of functionally graded aluminum-ceramic would be a plate made of the graded material in which the aluminum composition is graded to be higher on the outer side and lower on inner side than the ceramic composition.

The use of functionally graded aluminum-ceramic material is preferable when making a capacitor housing for vehicles, because of its characteristics such as (1) high surface hardness, (2) resistance to surface exfoliation, (3) high thermal radiation (high emission capacity at a far infrared region), (4) high slidability (5) high wear resistance, (6) high insulation, (7) high resistance to changes in weather and atmospheric salt.

FIG. 19 is a sectional view of the basic capacitor unit cell of the electric double layer capacitor in accordance with the present invention. As shown in FIG. 19, the capacitor unit cell in the present embodiment comprises polarizable electrode 3018, separator 3017, collector 3019, and seal rubber 3016. More specifically, polarizable electrode 3018 comprises an activated carbon powder electrode and sulfuric electrolyte. Separator 3017 is sandwiched between plus and negative electrodes. Separator 3017 can provide movement of an ion from one electrode to the other through Separator 3017, and prevent two electrodes from short circuiting. Two collectors 3019 are placed on the outer side of the two electrodes. Seal rubber 3016 is set on the side face of polarizable electrode 3018 for sealing electrolyte and insulating the conductive materials.

The electric double layer capacitor in the present embodiment has a configuration as follows. Laminated capacitor cell 3005 is made by laminating a plurality of capacitor unit cells. Negative electrode 3003 and positive electrode 3006 are placed at upper and lower sides of laminated capacitor cell 3005. Upper plate 3001 is placed above negative electrode 3003 via insulator plate 3002. Mounting portion 3007 is placed below positive electrode 3006 via insulator plate 3002. Laminated capacitor cell 3005 is stored in capacitor housing 3004.

According to the above configuration, resistance to vibration can be improved because no external mounting parts are used. Furthermore, the electric double layer capacitor in the present embodiment can be used in a temperature range of −40 to 85° C. because thin sulfuric acid solution is used as electrolyte instead of conventionally used organic electrolyte.

The dimensional and electrical characteristics of the electric double layer capacitor for vehicles described above are as follows:

dimensional: 72 mm length×148 mm width×84 mm height electric: Output voltage 24 V DC, Capacitance 5 F LED 3011 may be installed at upper plate 3001 or capacitor housing 3004 as an indicator for displaying the remaining capacity. It is noted that the electric characteristic of the electric double layer capacitor is not restricted to the explanation given above. The electric double layer capacitor may be designed to have electric characteristics as output voltage 15-60 V DC and capacitance 1-100 F.

Figure 22A:
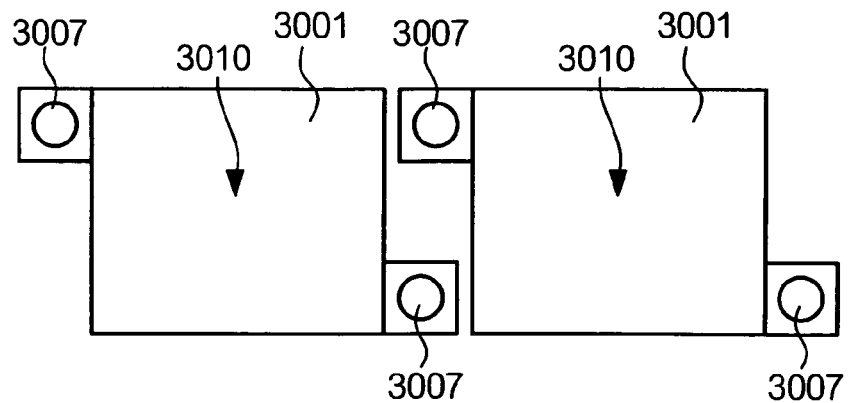
FIG. 22A through FIG. 22C shows examples of the configuration of the mounting portion of the electric double layer capacitor in accordance with the present invention.
Figure 22B:
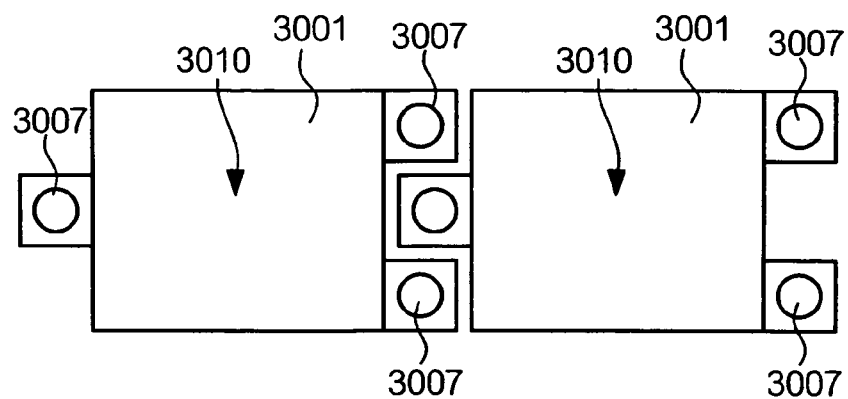
Figure 22C:
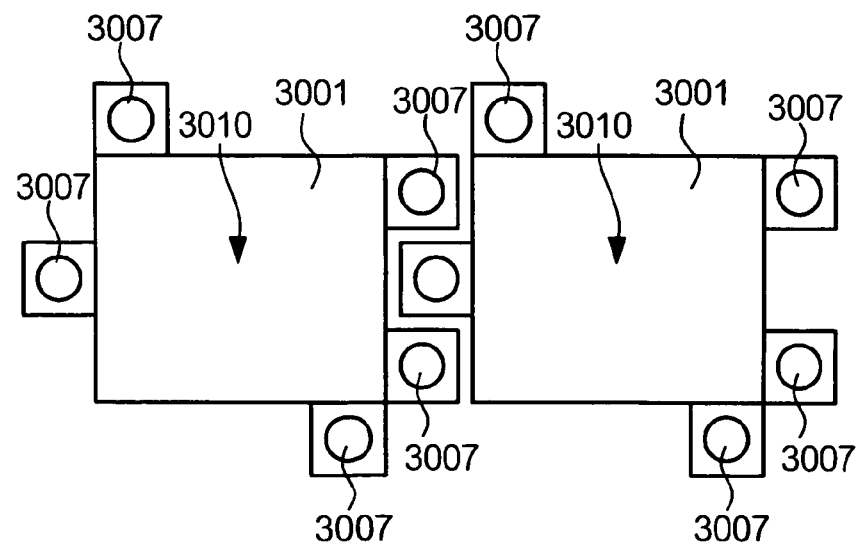

FIG. 22A-FIG. 22C shows examples of the configuration of the mounting portion of an electric double layer capacitor in accordance with the present invention.

FIG. 22A shows an example of a configuration of the mounting portion of the electric double layer capacitor 3010. In this example, two mounting portions 3007 are located at alternate sides of the shorter edges of the lower plate.

FIG. 22B shows another example of a configuration of the mounting portion of the electric double layer capacitor 3010. In this example, one mounting portion 3007 is located at the center of one shorter edge, and two mounting portions 3007 are located at double ends of the other edge, respectively.

FIG. 22C shows another example of a configuration of the mounting portion of the electric double layer capacitor 3010. In this example, two more mounting portions 3007 are located at alternate sides of the longer edges as well as three mounting portions shown in FIG. 22B.

A-2. Operation of Anti-Lock Brake System 1 for Trailers

A-2-1. Breaking Operation

The breaking operation of anti-lock brake system 1 for trailers will be described in this section.

When a driver of the vehicles operates brake valve 201, a pneumatic signal is transferred to brake control valve 14 as a brake command. The pneumatic signal is a variation in the pressure within brake pipe 11. Brake control valve 14 causes the pressure within brake cylinder pipe 13 to increase in response to the brake command.

When the pressure within brake cylinder pipe 13 is increased, pressure sensor 16 detects the brake command and outputs a brake signal to switch 57. Switch 57 turns on in response to the brake signal, and supplies power via power line 60 to each wheel speed sensor 52 and anti-skid brake system controller 51. Thus, wheel speed sensor 52 and anti-skid brake system controller 51 can be in operation. Therefore, the system can provide an operation with lower power consumption because it consumes power only when the brake command is received.

The anti-lock brake control method in the present embodiment is generally as follows. When breaking operation is being carried out, calculator 51A for anti-skid control determines whether a wheel is skidding, on the basis of a signal from wheel speed sensor 52 installed at the wheel. In the case that the wheel is determined to be skidding, a portion of the compressed air within the brake cylinder is released and then the breaking force is relaxed. After the breaking force is relaxed, calculator 51A for anti-skid control determines whether a wheel is still skidding, with the pressure within the brake cylinder being maintained. In a case that the wheel is determined to be still skidding, further portion of the compressed air within the brake cylinder is released and then the breaking force is further relaxed. After the breaking force is relaxed, same as described above, calculator 51A for anti-skid control determines whether a wheel is still skidding, with the pressure within the brake cylinder being maintained. In a case that the wheel is determined to be not skidding, the pressure within the brake cylinder is increased, after, which, maximum breaking force is applied. The anti-lock brake operation is achieved by repeating these operations.

Figure 13A:
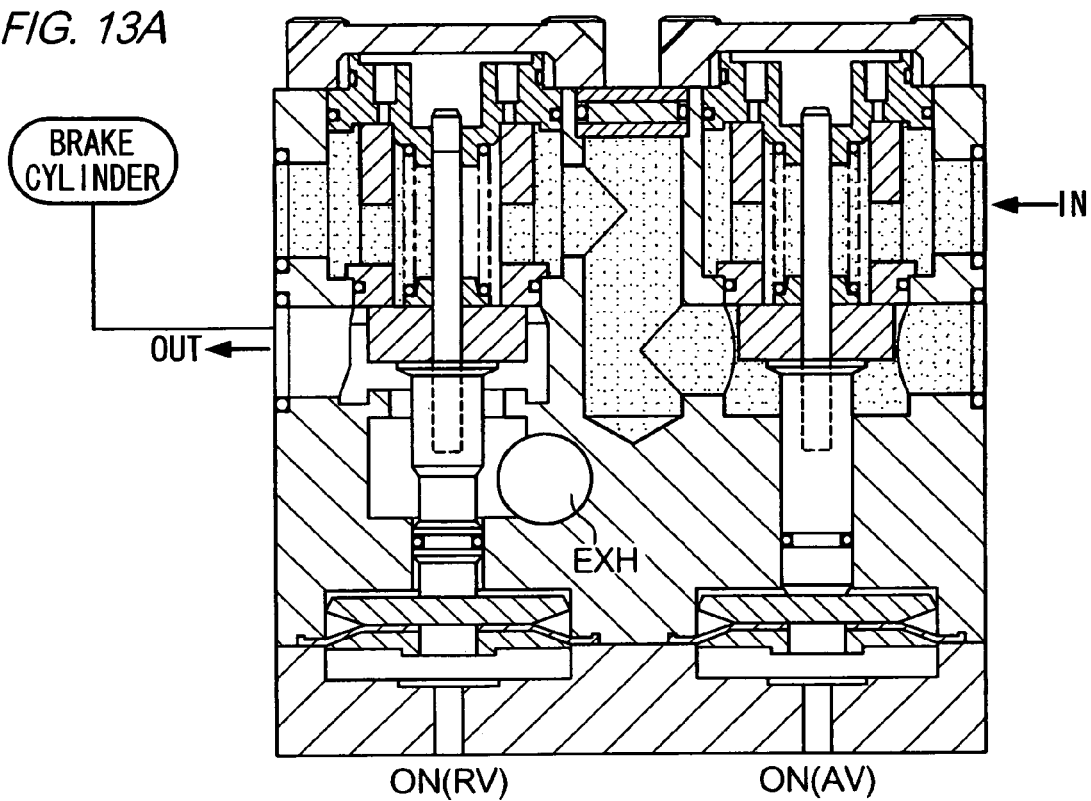
FIG. 13 is a schematic diagram showing the airflow of the anti-skid valve in operation in accordance with the present invention.
Figure 13B:
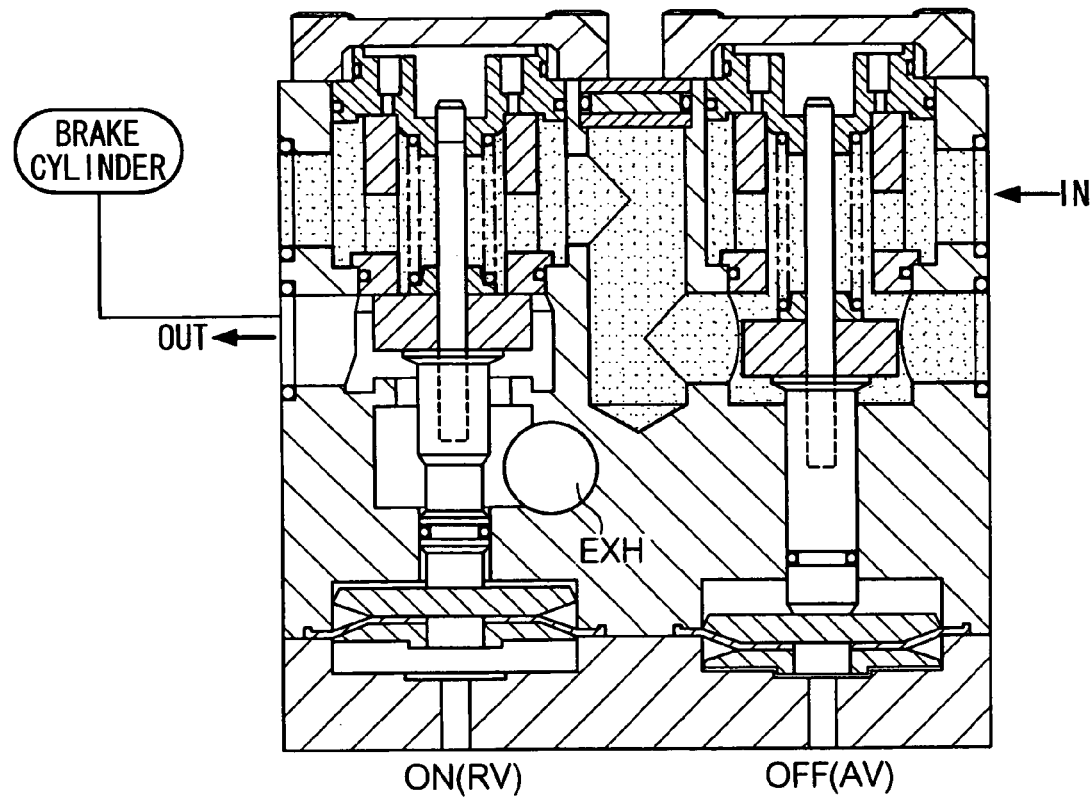
Figure 14A:
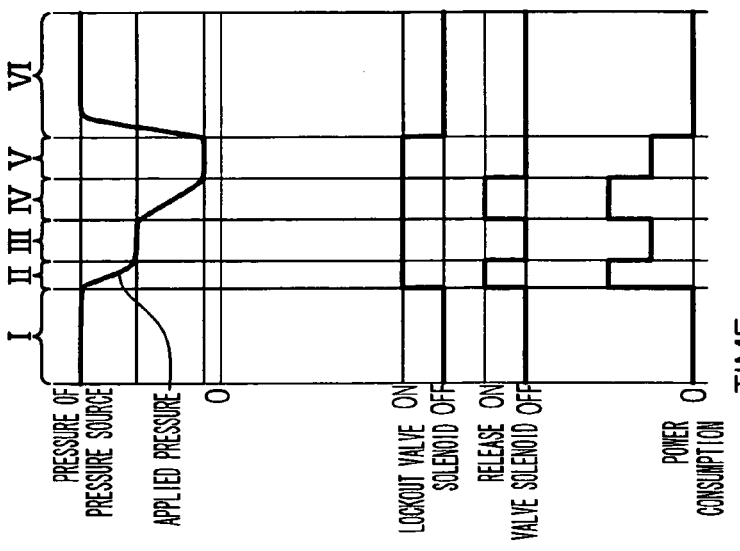
FIG. 14A shows time dependency of applied pressure and power consumption of the anti-skid valve in accordance with the present invention.
Figure 14B:
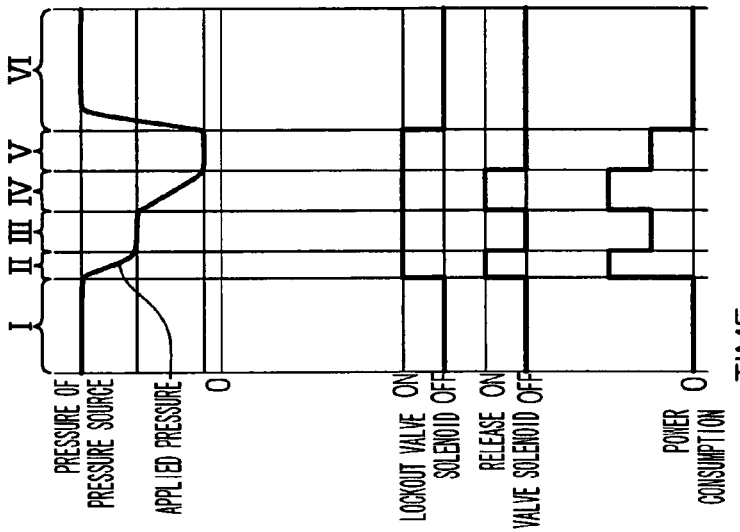
FIG. 14B shows time dependency of applied pressure and power consumption of the anti-skid valve in accordance with and the prior art.
Figure 14C:
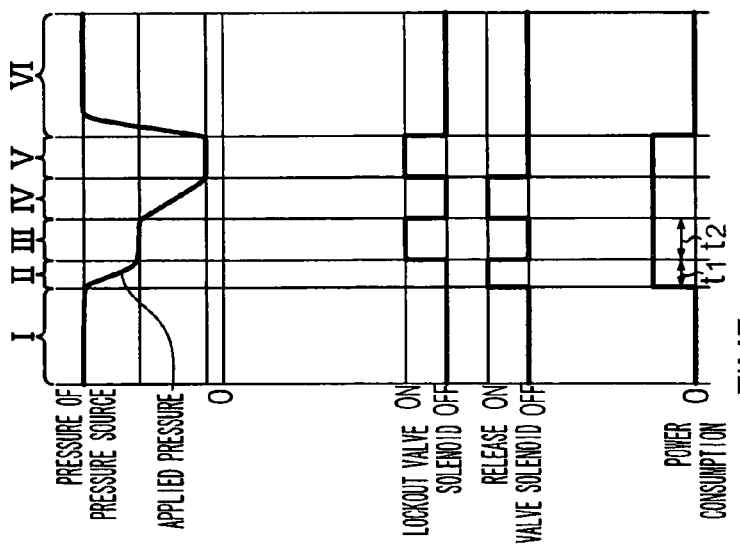
FIG. 14C shows time dependency of the anti-skid valve in accordance with the present invention operated by a control signal the same as that in the prior art.

The anti-lock brake control method according to the present invention will be described in detail with reference to FIG. 12 through FIG. 14C. In FIG. 14A through FIG. 14C, the top shows the time dependency of the operation pressure applied to the actuator (brake cylinder 12). The middle shows the time dependency of power consumption of each of pilot solenoid valve 2001R and 2001A. The bottom shows the time dependency of the sum of power consumption to pilot solenoid valve 2001R and 2001A. FIGS. 12 and 13 are schematic diagrams showing the air-flow of the anti-skid valve in operation in accordance with the present invention. In FIGS. 12 and 13, the shaded area represents the path of compressed air. In the description below, "open" the lockout valve refers to making a fluid path between its inlet port and outlet port (namely, connecting its inlet port to its outlet port), and "close" refers to shutting the fluid path between its inlet port and its outlet port (namely, closing its inlet port and outlet port). Similarly, "open" the release valve refers to making a fluid path between its inlet port and outlet port (namely, connecting its inlet port to its outlet port and closing its exhaust port), and "close" the release valve refers to making a fluid path between its outlet port and exhaust port (namely, connecting its outlet port to its exhaust port and closing its inlet port).

(1) Applying the Breaking Force

When the vehicle is rolling and the brake is not in operation (normal state), the pressure within brake pipe 11 is kept at 5 kgf/cm$^2$ (≈490 kPa) and the pressure within brake cylinder pipe 13 is kept at 0 kgf/cm$^2$ (=0 kPa). If the engine driver operates brake valve 201, the compressed air within brake pipe 11 is released into the atmosphere and then the pressure within brake pipe 11 decreases. Because brake control valve 14 is a proportional valve, compressed air is provided into brake cylinder pipe 13 in response to the decrease in the pressure within brake pipe 11. If the pressure within brake cylinder pipe 13 becomes high, the pressure is applied to brake cylinder 12. Then the breaking force is generated, e.g. by bringing a brake shoe into contact with a wheel. In a normal state, both pilot solenoid valve 2001R and 2001A are de-energized, and each of the two main valves of release valve 15R and lockout valve 15A are open. Therefore, the pressure within brake cylinder pipe 13 is kept equal to that of the pressure source.

(2) Detecting Skid

When the brake is in operation, calculator 51A for anti-skid control calculates basic axle speed Vs(t) as shown in Eq. (1), based on a signal from wheel speed sensor 52.

$$Vs(t)=Vs(t-1)-\beta \times t \quad (1)$$

wherein Vs(t)=Vmax, in the case of Vs(t)≦Vmax

β: deceleration of the vehicle

Vs: basic axle speed

Vmax: the maximum axle speed of eight wheel axles t: calculation period

If (a) the difference between calculated basic axle speed and wheel axle speed received from wheel speed sensor 52 and (b) deceleration (rate of change of speed) of the wheel axle speed exceeds a predetermined value, calculating portion 51A of anti-skid control unit 51 determines that the wheel is skidding.

(3) Relaxing the Breaking Force

In the case that the wheel is determined to be skidding, calculating portion 51A of anti-skid control unit 51 outputs to the two pilot valves an electric signal for causing lockout valve 15A to be opened and release valve 15R to be closed (see phase 4 in FIG. 9B), for a predetermined duration, $t_1$. Namely, calculating portion 51A outputs an electric signal for causing pilot solenoid valve 2001R to be energized and pilot solenoid valve 2001A to be de-energized. Each of the two pilot valves outputs a pneumatic signal to the pneumatic valve to which the pilot valve is connected, in response to the electric signal. The pneumatic valve is opened/closed in response to the pneumatic signal. Namely, lockout valve 15A is opened and release valve 15R is closed (see region II, IV in FIG. 14A; and FIG. 13A). In this phase, compressed air from the air reservoir is not fed into the brake cylinder, and compressed air within the brake cylinder is exhausted via release valve 15R. According to this operation, the pressure of compressed air within the brake cylinder is decreased to a certain amount. Thus, the breaking force is relaxed.

(4) Maintaining the Breaking Force

After duration $t_1$ has elapsed, calculating portion 51A of anti-skid control unit 51 outputs to the two pilot valves an electric signal for causing lockout valve 15A to be closed and release valve 15R to be opened (see phase 1 in FIG. 9B), during a predetermined duration, $t_2$. Namely, calculating portion 51A outputs an electric signal for causing pilot solenoid valve 2001R to be de-energized and pilot solenoid valve 2001A to be energized. Each of the two pilot valves outputs a pneumatic signal to the pneumatic valve to which the pilot valve is connected, in response to an electric signal. The pneumatic valve is opened/closed in response to the pneumatic signal. Namely, lockout valve 15A is closed and release valve 15R is opened (see region III, V in FIG. 14A; and FIG. 12A). In this phase, compressed air from the air reservoir is not fed into the brake cylinder, and compressed air within the brake cylinder is not released via release valve 15R. According to this operation, the pressure of compressed air within the brake cylinder is kept at a decreased value. Thus the breaking force is maintained. After duration $t_2$ has elapsed, calculating portion 51A determines whether the wheel is still skidding. If the wheel is determined to be still skidding, the breaking force is further relaxed in the same manner.

(5) Re-Applying the Breaking Force

Figure 9B:
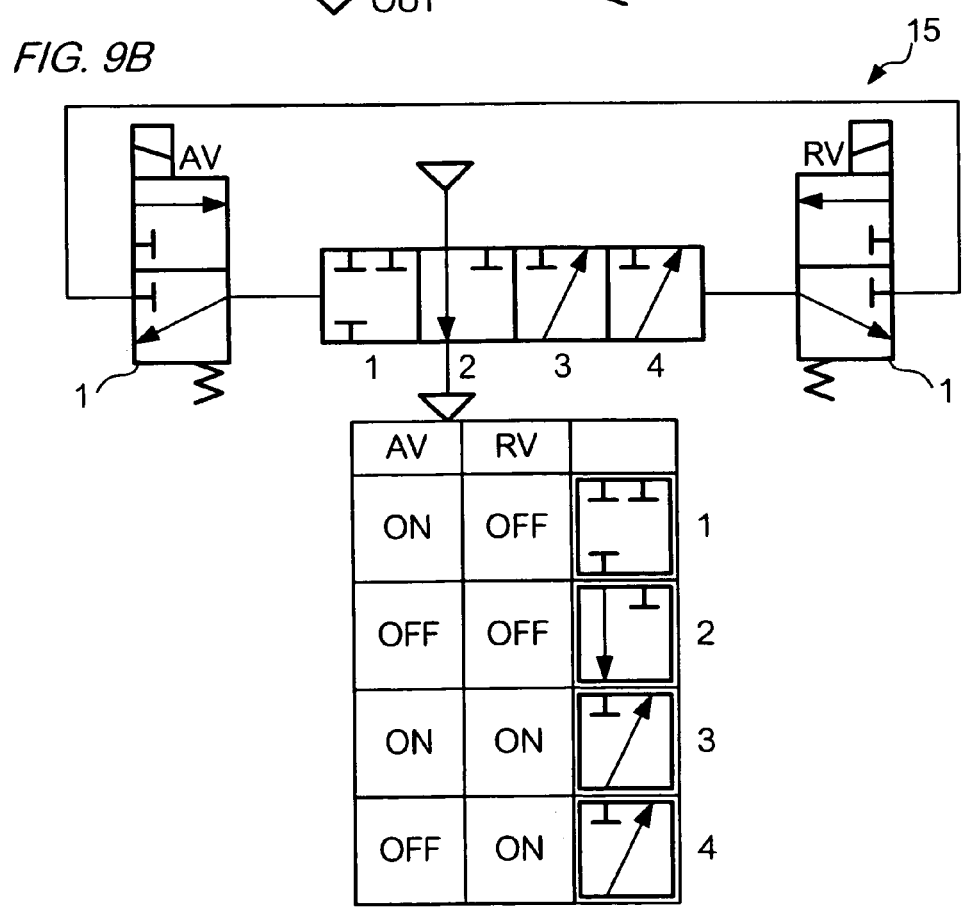
FIG. 9B is a schematic diagram showing the phases of the anti-skid valve in the anti-lock brake system for trailers in accordance with the present invention.

If the wheel is determined to be not skidding, calculating portion 51A of anti-skid control unit 51 outputs to the two pilot valves an electric signal for causing both lockout valve 15A and release valve 15R to be opened (see phase 2 in FIG. 9B). Namely, calculating portion 51A outputs signal for causing both pilot solenoid valve 2001R and 2001A to be de-energized. Each of the two pilot valves outputs a pneumatic signal to the pneumatic valve to which the pilot valve is connected, in response to the electric signal. The pneumatic valve is opened/closed in response to the pneumatic signal. Namely, both lockout valve 15A and release valve 15R are opened (see region VI in FIG. 14A; and FIG. 12B). Thus the breaking force is re-applied.

As described above, anti-lock brake system 1 for trailers can control the breaking force for preventing wheel 101 from skidding on the rail. The anti-lock brake control method in the present invention will be compared with that in the prior art as shown in FIG. 14,B. In the prior art, both two pilot solenoid valves are required to be energized when the breaking force is relaxed. Therefore, a large amount of power is consumed when the breaking force is relaxed. On the contrary, according to the anti-lock brake control method in the present invention as shown in FIG. 14A, only one of the two pilot solenoid valves 2001R and 2001A is energized when the breaking force is relaxed or maintained. Thus, a lesser amount of power is required for the anti-skid operation of anti-lock brake system 1 compared with the prior art.

Anti-skid valve 15 in the present invention is a valve, which provides the operations for applying, relaxing, or maintaining the breaking force in response to the electronic signal, which causes only one of the two pilot valves to be energized, as shown in Table 1. In Table 1, "0" denotes a signal for de-energizing and "1" denotes a signal for energizing.

TABLE 1

| | electric signal for anti-lock operation | |
|---|---|---|
| | lockout valve solenoid | release valve solenoid |
| applying | 0 | 0 |
| relaxing | 0 | 1 |
| maintaining | 1 | 0 |

Furthermore, the anti-skid valve in the present embodiment can be operated by using the control method in the prior art. Namely, as shown in FIG. 14C, by using the control signal in the same manner as in the prior art with the two pilot solenoid valves, the anti-skid valve in the present embodiment can perform the anti-skid operation.

Figure 15A:
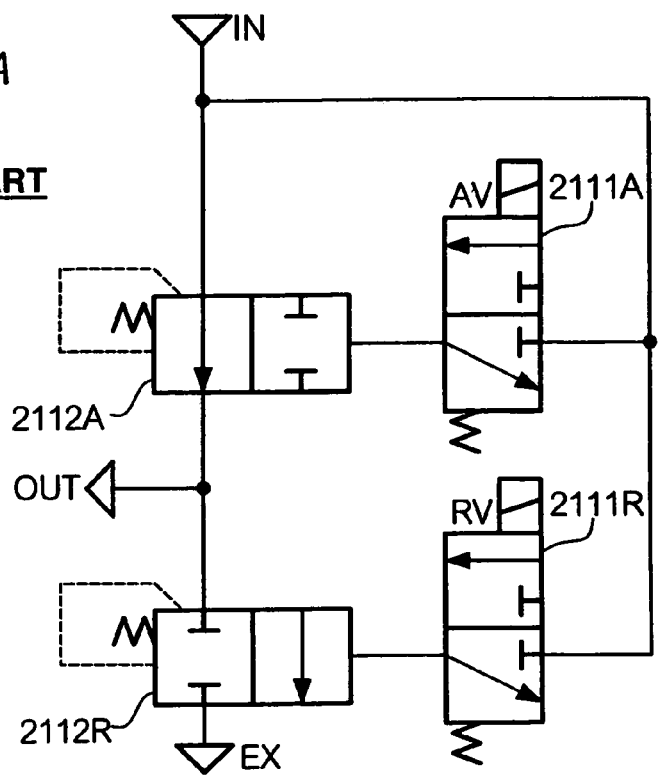
FIG. 15A is a circuit diagram of a pneumatic circuit of the anti-skid valve in the anti-lock brake system for trailers in accordance with the prior art.
Figure 15B:
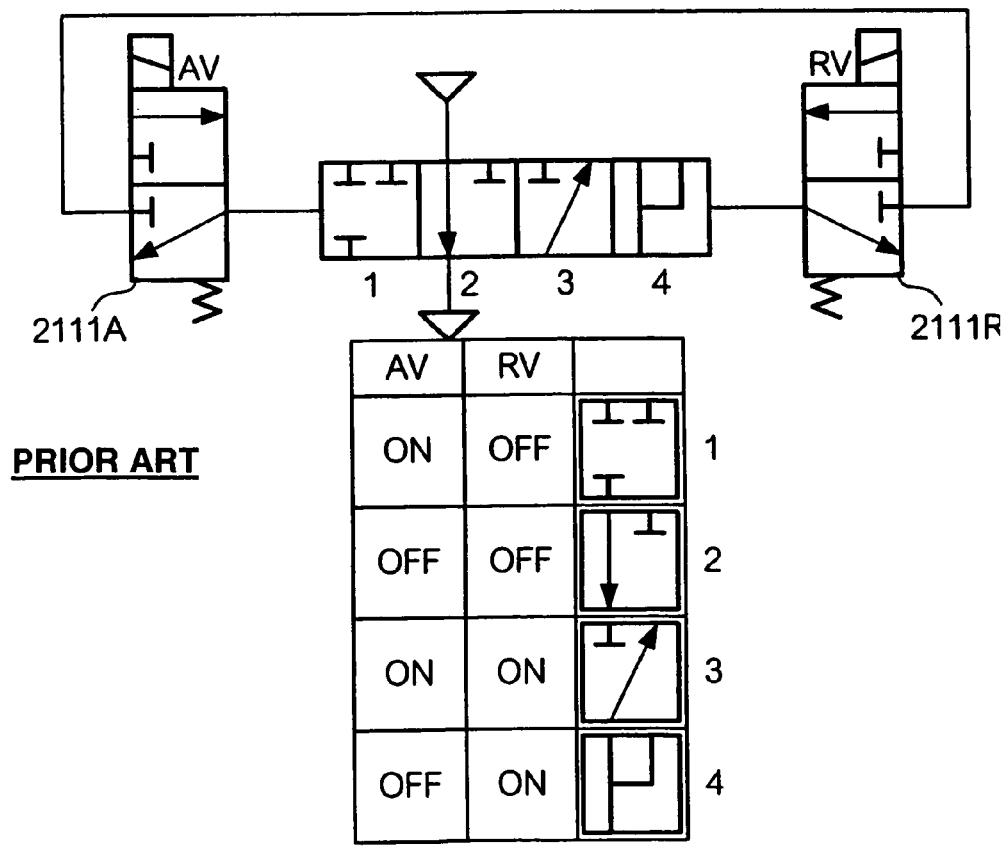
FIG. 15B is a schematic diagram showing the phases of the anti-skid valve in the anti-lock brake system for trailers in accordance with the prior art.

It should be noted that either the inlet port or the exhaust port must be necessarily closed because a two-position three-way valve is used as the release valve. Therefore, the phase in which all of the ports are opened (FIG. 15B: phase 4) does not exist in the present embodiment. Thus the anti-lock brake system can provide a safer anti-lock operation than the system of the prior art.

A-2-2. Charging Electric Double Layer Capacitor

As described above, in the case that the speed of wheel 101 is high so that wheel generator 53 generates enough power to charge electric double layer capacitor 54, electric double layer capacitor 54 is charged by both power supply 40 via power line 300 and wheel generator 53. On the contrary, in the case that the speed of wheel 101 is low so that wheel generator 53 cannot generate enough power to charge electric double layer capacitor 54, electric double layer capacitor 54 is charged with power from only power supply 40.

In the present system, the power stored in electric double layer capacitor 54 is discharged heavily in the operation, because pilot solenoid valve 2001R and 2001A are required to be operated quickly. The present system can prevent electric double layer capacitor 54 from being discharged completely by employing a system in which electric double layer capacitor 54 is charged by both power supply 40 and wheel generator 53.

Furthermore, electric double layer capacitor 54 is preferable for power supply for railway vehicles because electric double layer capacitor 54 has a characteristic that it needs less time to be fully charged even after being discharged completely.

Therefore, in the present embodiment, the secondary battery can be charged immediately even after being over discharged, because the system uses electric double layer capacitor 54 as the secondary battery and the power supply circuit which can charge even after being over discharged. The present system provides greater efficiency in operation and higher reliability compared with the prior art.

Additionally, in the present invention, the battery is maintenance free because it is not necessary to dismount an over-discharged secondary battery for charging as required in the prior art.

A-2-3. Failure-Proof Operation

In the present invention, the pressure within brake pipe 11 is kept at 5 kgf/cm$^2$ (normal pressure) and the pressure within brake cylinder pipe 13 is kept at 0 kgf/cm$^2$ the atmospheric pressure when the brake is not in operation. When the brake is operated, the pressure within brake pipe 11 decreases from a normal pressure and the pressure within brake cylinder pipe 13 increases. If the pressure within brake pipe 11 decreases because of a leak or a breakage of brake pipe 11, the pressure within brake cylinder pipe 13 increases proportionally in accordance with the operation of brake control valve 14. Namely, without a brake command, the brake is operated in a case that some abnormality in functioning occurs. This is a failure-proof operation. Additionally, if the increase of the pressure within brake cylinder pipe 13 is detected by pressure sensor 16 without a break command, pressure sensor 16 provides notification of vehicle abnormality since pressure sensor 16 monitors the pressure within brake cylinder pipe 13.

B. Second Embodiment

The anti-lock brake system according to the second embodiment of the present invention employs an electric and air command automatic air brake system, which transfers a brake command via command line with an electric signal and via brake pipe with a pneumatic signal.

Figure 5:
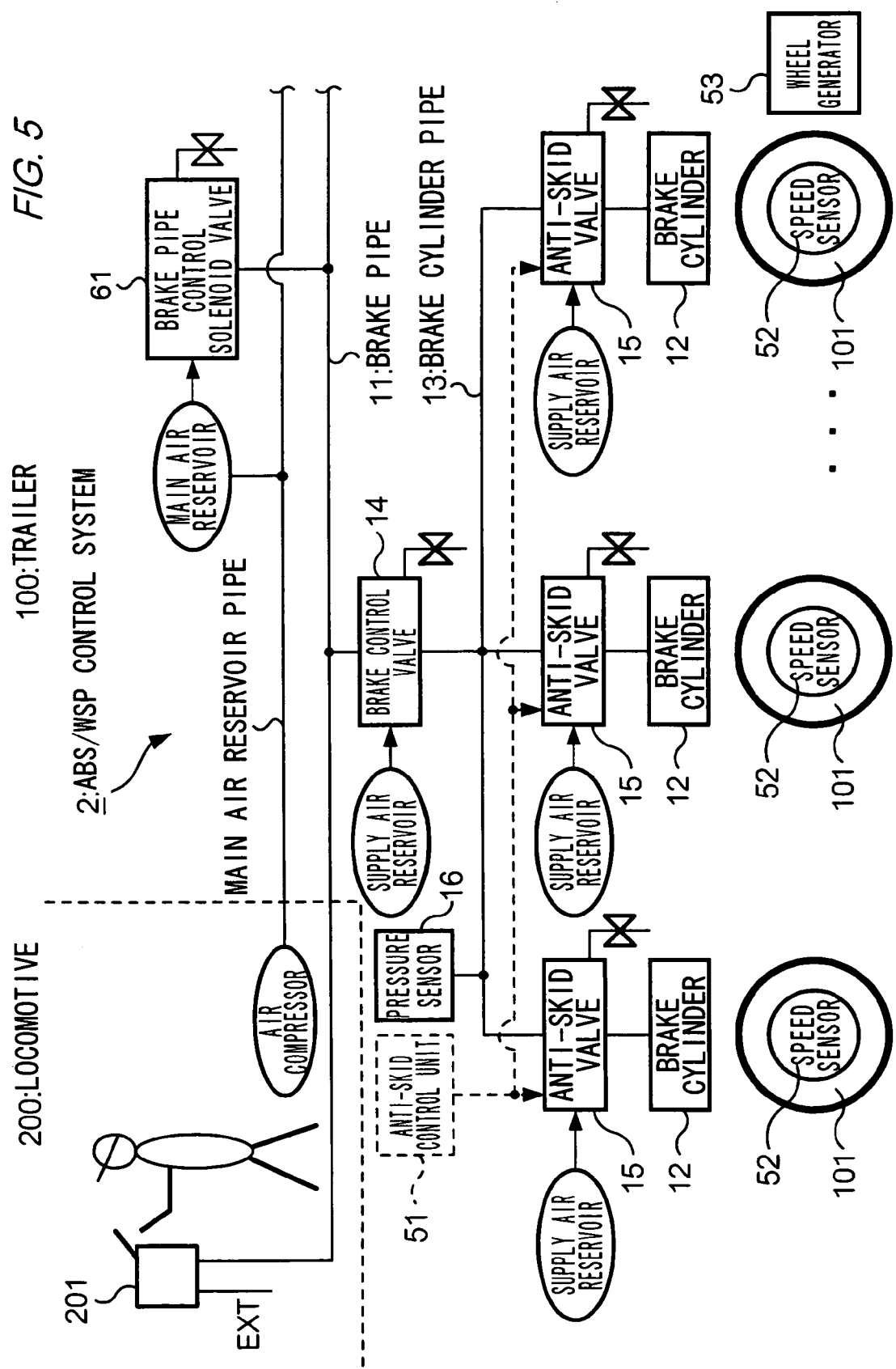
FIG. 5 is a block diagram showing the configuration of the pneumatic system in the anti-lock brake system for trailers in accordance with the second embodiment of the present invention.

FIG. 5 is a block diagram showing the configuration of the pneumatic system in the anti-lock brake system for trailers in accordance with the second embodiment of the present invention. In FIG. 5, the same components as of the first embodiment are referred to with the same reference numerals; therefore a description of the same will be omitted in this section.

As shown in FIG. 5, the dominant feature of the second embodiment comprises brake pipe control solenoid valve 61 and brake control unit 71. Brake pipe control solenoid valve 61 is connected to brake pipe 11. Brake control unit 71 controls brake pipe control solenoid valve 61.

In the present embodiment, locomotive 200 comprises a brake command unit 210 for trailers shown as dashed line in FIG. 1. Brake command unit 210 outputs an electric signal as a brake command. Brake command unit 210 is operated by, for example, a handle operated by a driver. The handle operates brake valve 201 by which the pneumatic signal is outputted as a brake command. When the engine driver operates the handle (not shown in the figures), a brake command is generated and transferred in two different ways, one by a pneumatic signal from brake valve 201 and the other by an electric signal from brake command unit 210.

The brake command by a pneumatic signal from brake valve 201 is transferred via brake pipe 11 to brake control valve 14 as shown in FIG. 5. Brake control valve 14 causes the pressure within brake cylinder pipe 13 to be increased in response to the brake command. When the pressure within brake cylinder pipe 13 increases, pressure sensor 16 connected to brake cylinder pipe 13 detects the brake command and transmits a brake signal by electric signal to brake control unit 71.

B-1. Configuration of Brake Pipe Control Solenoid Valve 61

The configuration of brake pipe control solenoid valve 61 will be described in this section.

Figure 6:
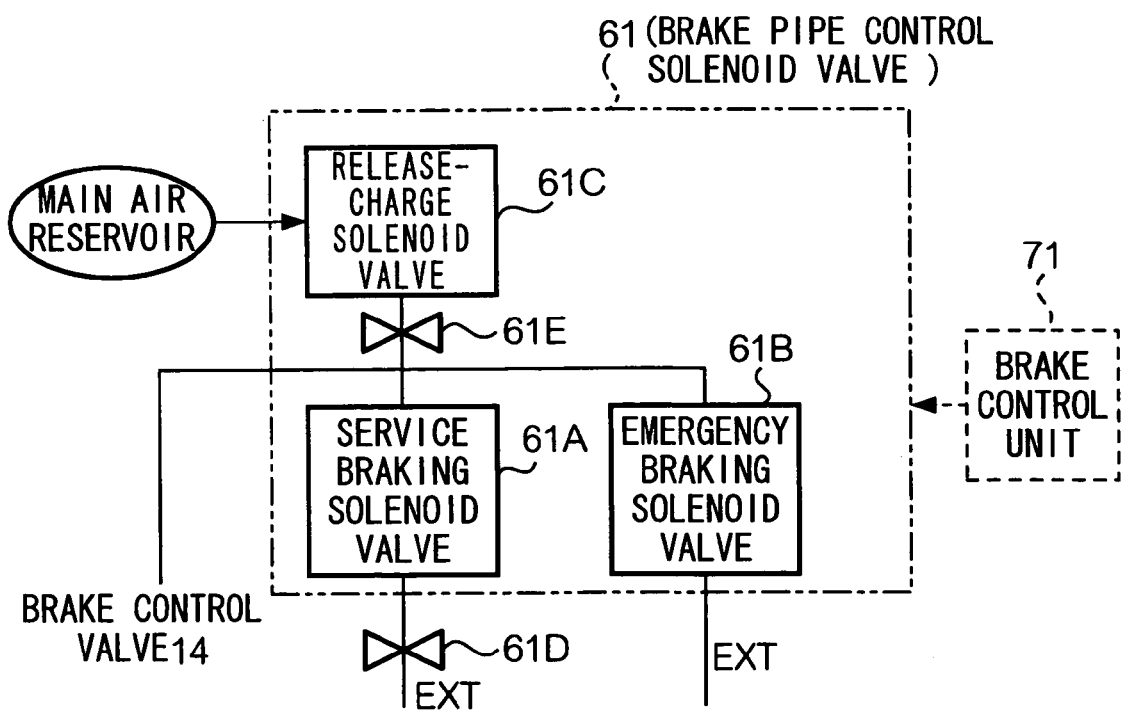
FIG. 6 is a block diagram illustrating the configuration of the brake pipe control valve in the anti-lock brake system for trailers in accordance with the second embodiment of the present invention.

FIG. 6 is a block diagram illustrating the configuration of the brake pipe control valve in the anti-lock brake system for trailers in accordance with the second embodiment of the present invention. Brake pipe control solenoid valve 61 controls the pressure within brake pipe 11 in response to the brake signal from brake control unit 71 (described in detail later).

As shown in FIG. 6, brake pipe control solenoid valve 61 comprises service breaking solenoid valve 61A, emergency breaking solenoid valve 61B, and release-charge solenoid valve 61C. These valves 61A, 61B, and 61C are connected to brake pipe 11. These valves 61A, 61B, and 61C control the pressure within brake pipe 11 by using electromagnetic power generated by solenoids, that is, decreasing the pressure by exhausting the compressed air within brake pipe 11 or increasing pressure to 5 kgf/cm$^2$ by feeding compressed air into brake pipe 11

The inlet port of service breaking solenoid valve 61A is connected to brake pipe 11, and the outlet port has an external opening via restrictor 61D. Restrictor 61D provides gradual release of compressed air into the atmosphere. The inlet port of emergency breaking solenoid valve 61B is connected to brake pipe 11, and the outlet port has an external opening. The inlet port of release-charge solenoid valve 61C is connected to air reservoir MR, which is the pressure source and the outlet port is also connected to brake pipe 11 via restrictor 61E.

Brake pipe control solenoid valve 61 releases the compressed air within brake pipe 11 by operating service breaking solenoid valve 61A or emergency breaking solenoid valve 61B in response to the brake command from brake command unit 210 brake control unit 71. Then the pressure within brake pipe 11 decreases. If the brake command requests a service brake, service breaking solenoid valve 61A gradually releases the compressed air within brake pipe 11 via restrictor 61D. If the brake command requests an emergency brake, emergency breaking solenoid valve 61B immediately releases the compressed air within brake pipe 11. Thus the system in the present embodiment can transfer to each freight car 100 the brake command faster than the brake command by a pneumatic signal.

If the brake command is canceled, the energized solenoid valve (service breaking solenoid valve 61A or emergency breaking solenoid valve 61B) is de-energized and release-charge solenoid valve 61C is energized. Thus the pressure within brake pipe 11 returns to 5 kgf/cm².

B-2. Configuration of Brake Control Unit 71

Figure 7:
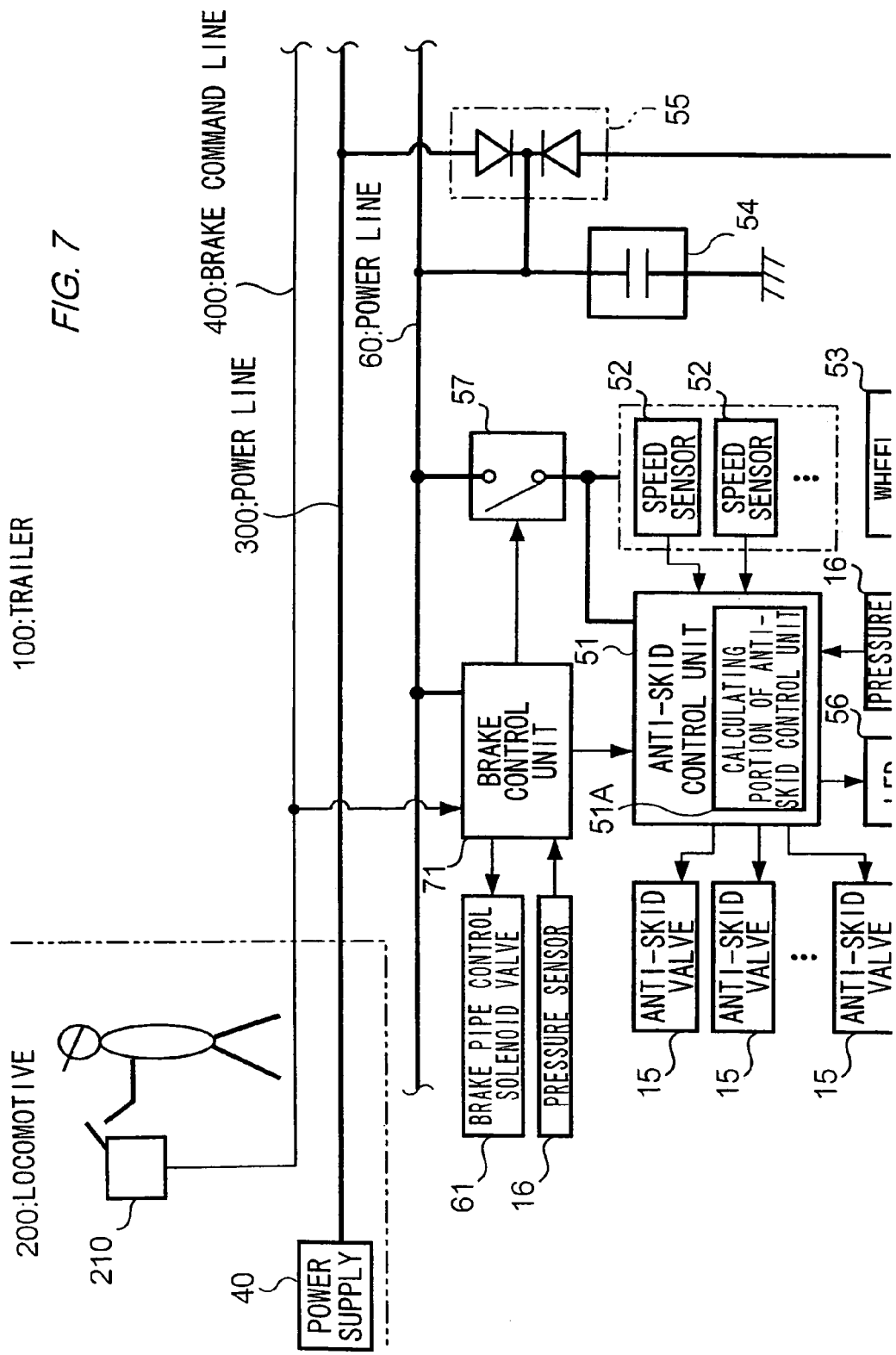
FIG. 7 is a block diagram illustrating the configuration of the electric system in the anti-lock brake system for trailers in accordance with the second embodiment of the present invention.

FIG. 7 is a block diagram illustrating the configuration of the electric system in the anti-lock brake system for trailers in accordance with the second embodiment of the present invention. Each of brake command unit 210 and brake control unit 71 includes a microcomputer comprising a CPU, RAM, and ROM (all not shown in the figures). As shown in FIG. 7, brake control unit 71 has a connection at its input side to pressure sensor 16 and two connections at its output side to brake pipe control solenoid valve 61 and switch 57. Brake control unit 71 stores programs and parameters for different controls. When brake control unit 71 receives a brake command transmitted via pressure sensor 16, brake control unit 71 outputs the brake command to brake pipe control solenoid valve 61 and causes to provide power to anti-skid brake system controller 51 and each wheel speed sensor 52 by switching on switch 57.

Brake control unit 71 is always operating because power is provided to brake control unit 71 via power line 60.

B-3. Operation in the Present Embodiment

In the present embodiment, the configuration of the power supply unit for charging electric double layer capacitor 54 is the same as in the first embodiment. Therefore, similarly to the first embodiment, electric double layer capacitor 54 can be charged immediately even after being over-discharged. Thus the brake system has high reliability.

Additionally, in the present embodiment, an electric signal is used as a brake command as well as a pneumatic signal. The electric signal is transmitted faster than the pneumatic signal. The pneumatic signal has a possibility that a transmission delay may occur because the pneumatic signal cannot be transferred faster than sonic speed. In North America or Australia, an appreciable time is necessary for the brake command by a pneumatic signal to reach the end of the train if the train is a few kilometers long. According to the present embodiment, the brake command by an electric signal provides un-delayed brake to a large number of freight cars 100 by receiving the brake command concurrently.

C. Third Embodiment

The anti-lock brake system according to the third embodiment of the present invention employs a brake command via wireless communication instead of wired communication.

Figure 8:
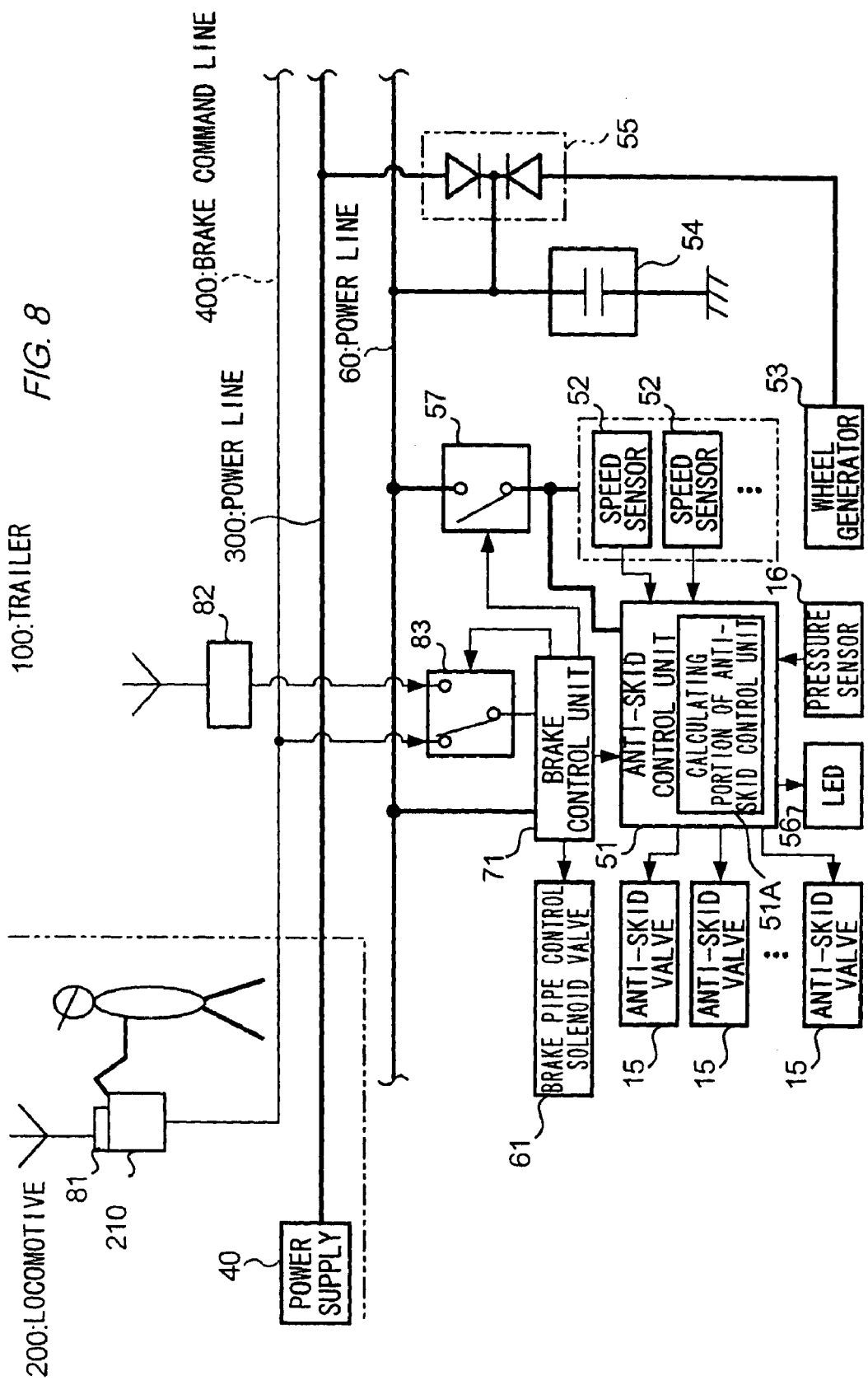
FIG. 8 is a block diagram illustrating the configuration of the electric system in the anti-lock brake system for trailers in accordance with the third embodiment of the present invention.

FIG. 8 is a block diagram illustrating the configuration of the electric system in the anti-lock brake system for trailers in accordance with the third embodiment of the present invention. The same components as the first embodiment and the second embodiment are referred to with the same reference numerals, and therefore a description of the same will be omitted in this section.

Brake command unit 210 comprises transmitter unit 81 for converting the brake command to a wireless signal and for transmitting it. Correspondingly, freight car 100 comprises receiver unit 82 for receiving the wireless brake command. Freight car 100 also comprises switch 83 for selecting the receiving mode of the brake command, which is transmitted to brake control unit 71, that is wired or wireless. Switch 83 is controlled by brake control unit 71.

According to the third embodiment of the present invention, the brake command by wireless communication, which is transmitted to brake control unit 71 provides un-delayed brake among freight cars 100 because the brake command is received concurrently among all freight cars 100. Additionally, the present embodiment can eliminate the need for installing a cable between two consecutive trailers.

D. Modification

The above-described embodiments of the present invention are merely exemplary in nature and, thus, variations that do not depart from the main concept of the invention are intended to be within the scope of the invention.

D-1. First Modification

Although pressure sensor 16 is described as that which determines whether the brake is operating on the basis of the monitor of the pressure within brake cylinder pipe 13, pressure sensor 16 may output a signal for operating anti-skid valve 15 to brake control unit 71 which cannot receive the brake command due to some reasons.

D-2. Second Modification

Although pneumatic fluid (compressed air) is used as fluid for transferring a breaking force, hydraulic fluid or a combination of hydraulic fluid and pneumatic may also be used as fluids for transferring the breaking force.

D-3. Third Embodiment

Although the brake command is transferred by (a) a pneumatic signal, (b) both a pneumatic signal and a wired electric signal, (c) both a pneumatic signal and a wireless electric signal, and (d) a pneumatic signal, a wired electric signal, and a wireless electric signal, it is also possible that the brake command may be transferred by any other appropriate communication method.

D-4. Fourth Modification

Although electric double layer capacitor 54 is described as a secondary battery in the above embodiments, a chemical battery (storage battery), for example a manganese-based lithium ion battery, may be used for a power supply.

D-5. Fifth Modification

Switch 57 may be omitted. Namely, power may be always provided to anti-skid brake system controller 51 and wheel speed sensor 52 via power line 60.

D-6. Sixth Modification

Although wheel generator 53 is described as a self-excited induction generator, separately-excited generator may be used as a generator. In this case, the stator or rotor of the generator is energized concurrently with anti-skid brake system controller 51 and wheel speed sensor 52 in accordance with the switching operation by switch 57.

D-7. Seventh Modification

Figure 23:
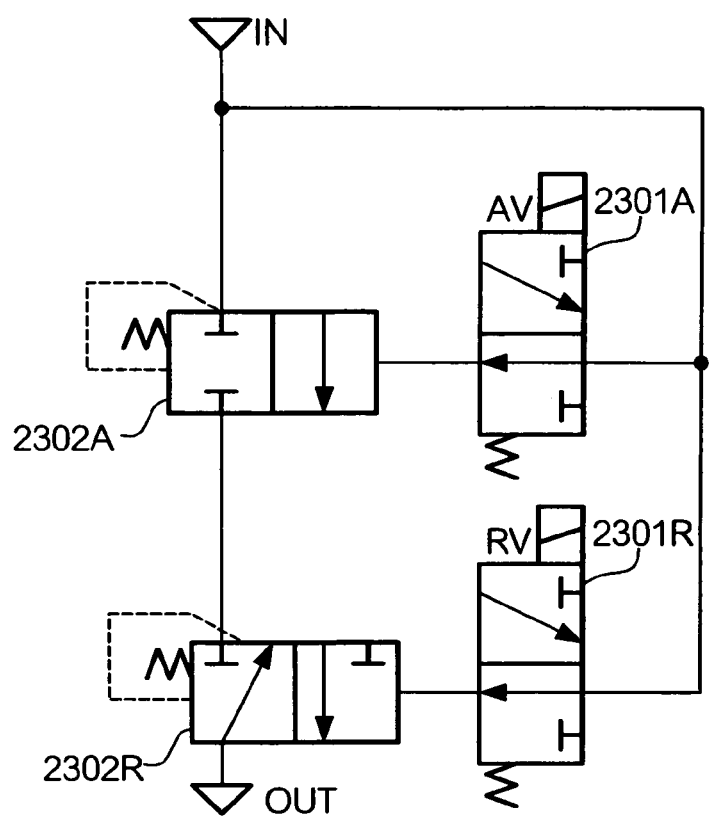
FIG. 23 shows one modification of a pneumatic circuit of the anti-skid valve in the anti-lock brake system for trailers in accordance with the present invention.

The configuration of anti-skid valve 15 is not restricted to the above-mentioned description. FIG. 23 shows one modification of a pneumatic circuit of the anti-skid valve in the anti-lock brake system for trailers in accordance with the present invention. As shown in FIG. 23, the anti-skid valve in the present modification comprises (1) a lockout valve comprising a normally-closed main valve 2302A and a normally-open pilot valve 2301A, and (2) a release valve comprising a normally-closed main valve 2302R and a normally-open pilot valve 2301R. The present anti-skid valve is the same as the anti-skid valve in the above embodiments except the operation mode of two main valves and two pilot valves. The present anti-skid valve can provide the same operation as the above-described embodiments by using the same control signal as the above described embodiments.

Figure 24:
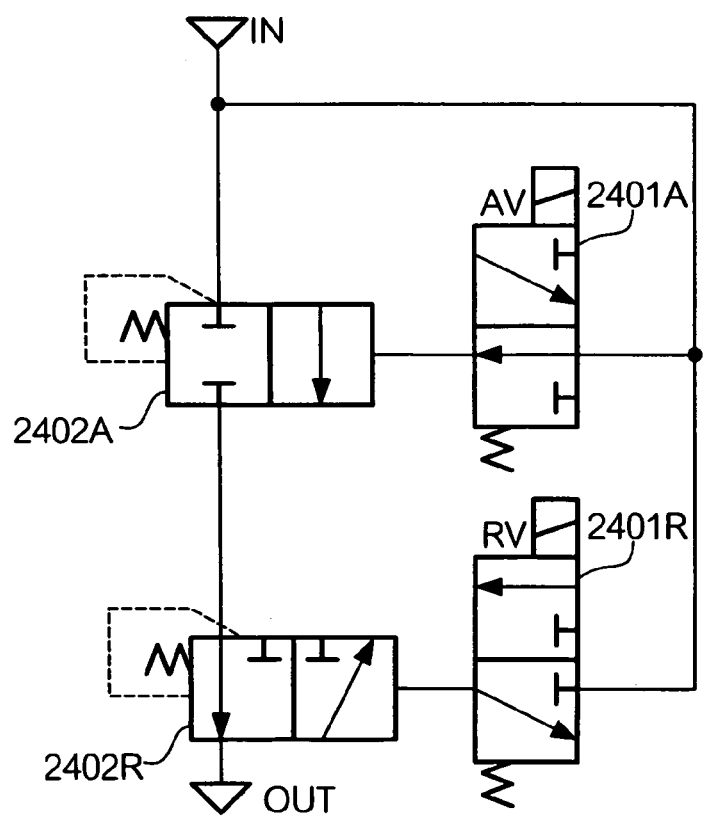
FIG. 24 shows another modification of a pneumatic circuit of the anti-skid valve in the anti-lock brake system for trailers in accordance with the present invention.

FIG. 24 shows another modification of a pneumatic circuit of the anti-skid valve in the anti-lock brake system for trailers in accordance with the present invention. As shown in FIG. 24, anti-skid valve may comprise (1) a lockout valve comprising a normally-closed main valve 2402A and a normally-open pilot valve 2401A, and (2) a release valve comprising a normally-open main valve 2402R and a normally-closed pilot valve 2401R. The present anti-skid valve is the same as the anti-skid valve in the above embodiments except for the operation mode of two main valves and two pilot valves. The present anti-skid valve can provide the same operation as the above-described embodiments by using the same control signal as the above described embodiments.

Figure 25:
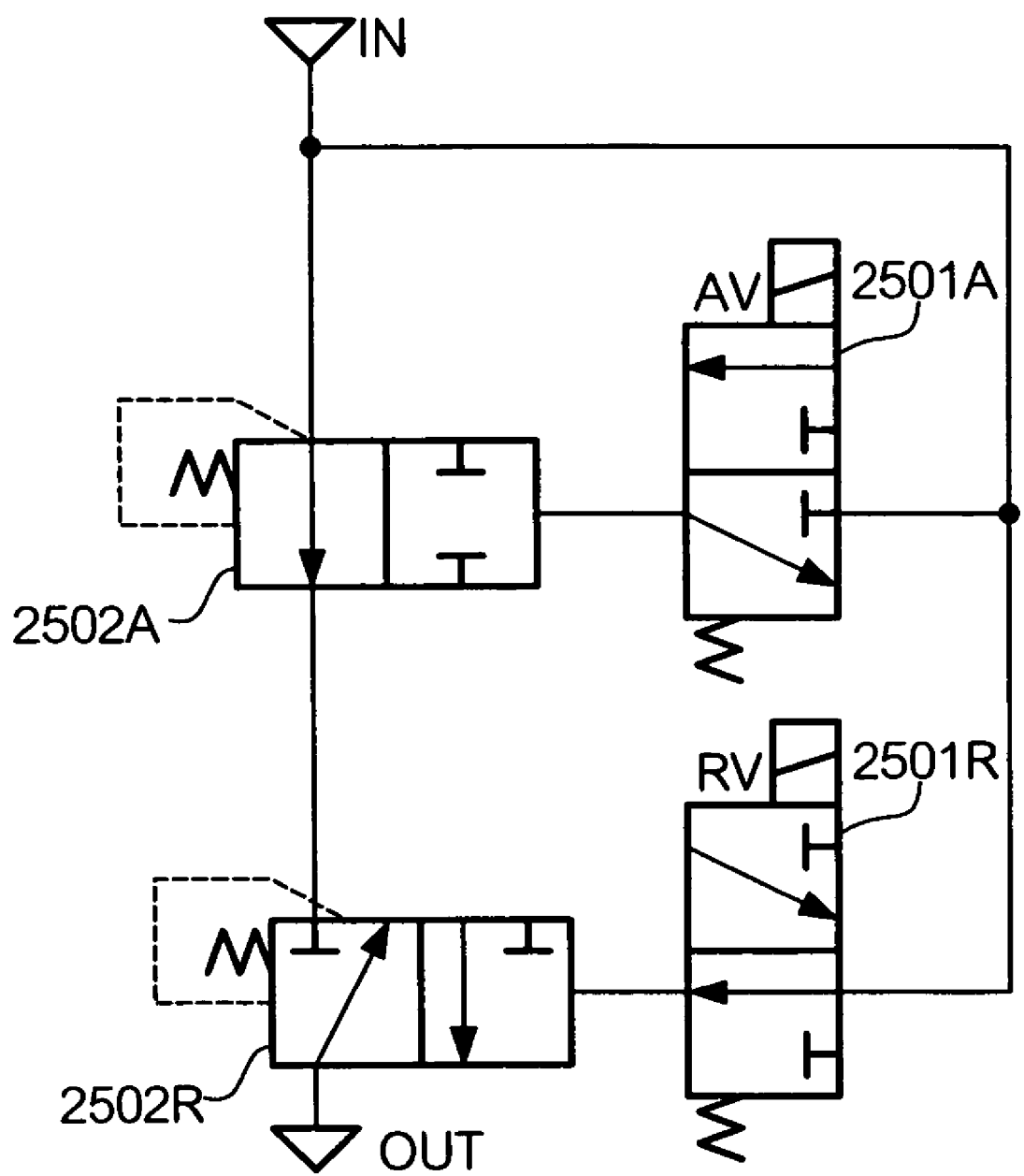
FIG. 25 shows another modification of a pneumatic circuit of the anti-skid valve in the anti-lock brake system for trailers in accordance with the present invention.

FIG. 25 shows another modification of a pneumatic circuit of the anti-skid valve in the anti-lock brake system for trailers in accordance with the present invention. As shown in FIG. 25, anti-skid valve may comprise (1) a lockout valve comprising a normally-open main valve 2502A and a normally-closed pilot valve 2501A, and (2) a release valve comprising a normally-closed main valve 2502R and normally-open pilot valve 2501R. The present anti-skid valve is the same as the anti-skid valve in the above embodiments except the operation mode of two main valves and two pilot valves. The present anti-skid valve can provide the same operation as the above-described embodiments by using the same control signal as the above-described embodiments.

As described above, an anti-skid valve which comprises (1) a two-way lockout valve comprising a pilot valve and a main valve whose operation mode is different from the pilot valve, and (2) a three-way release valve comprising a pilot valve and a main valve whose operation mode is different from the pilot valve, provides the anti-lock brake control method of the present invention.

E. EFFECT OF THE INVENTION

The present invention provides an anti-lock brake system, which has characteristics such as high safety, high reliability, and low power consumption.

The invention claimed is:

1. An anti-lock brake system for a trailer hauled by a motor-powered car having a brake command output unit that outputs a brake command, the anti-lock brake system comprising:
   (A) a braking force generating unit configured to generate braking force to a plurality of wheels of the trailer, the braking force being generated by a fluid;
   (B) an anti-skid valve configured to relax the braking force generated by the braking force generating unit;
   (C) a plurality of skid detection units, each configured to one of the plurality of skid detection units configured to detect skid of the wheels to which the respective one of the plurality of skid detection units is installed;
   (D) an anti-skid brake system controller configured to output a command instructing relaxation of the braking force to the anti-skid valve on the basis of a signal from the skid detection unit;
   (E) a secondary battery configured to provide electric power to the braking force generating unit, the plurality of skid detection units, and the anti-skid brake system controller; and
   (F) a generator configured to charge the secondary battery; the generator being installed on at least one of the plurality of wheels and generating power in response to the rotation of the one of the plurality of wheels, the secondary battery being charged by power generated by the generator.

2. An anti-lock brake system according to claim 1, wherein the anti-skid valve includes:
   (1) a two-way valve including
      (1-A) a first pilot valve whose operation mode is normally-open or normally-closed, and
      (1-B) a first main valve whose operation mode is different from the first pilot valve
   (2) a three-way valve connected serially to the two-way valve comprising
      (2-A) a second pilot valve whose operation mode is normally-open or normally-closed, and
      (2-B) a second main valve whose operation mode is different from that of the first pilot valve.

3. An anti-lock brake system according to claim 1, wherein:
   the power generated by the generator increases with the increased rotational frequency of the wheel; and
   the generator is configured to generate enough power to charge the secondary battery when the rotational frequency of the at least one of the plurality of wheels exceeds a predetermined value.

4. An anti-lock brake system according to claim 1, further comprising:
   a power supply control unit configured to cause the secondary battery to provide power to the skid detection unit and the anti-skid brake system controller when the anti-lock brake system is in operation.

5. An anti-lock brake system according to claim 3, further comprising:
   a power supply control unit configured to cause the secondary battery to provide power to the skid detection unit and the anti-skid brake system controller when the anti-lock brake system is in operation.

6. An anti-lock brake system according to claim 1, wherein the secondary battery is an electric double layer capacitor.

7. An anti-lock brake system according to claim 3, wherein the secondary battery is an electric double layer capacitor.

8. An anti-lock brake system according to claim 4, wherein the secondary battery is an electric double layer capacitor.

9. An anti-lock brake system according to claim 1, wherein the brake command is transmitted by wired communication.

10. An anti-lock brake system according to claim 1, wherein the brake command is transmitted by wireless communication.

11. An anti-lock brake system according to claim 1, further comprising:
    a pipe installed from the motor-powered car to the trailer; and
    a fluid with the pipe,
    wherein the brake command is transmitted through the fluid.

12. An anti-lock brake system according to claim 11, further comprising:
    a pressure sensor configured to monitor the pressure of the fluid and configured to output a brake command.

13. An anti-lock brake system according to claim 6, wherein the electric double layer capacitor includes:

a laminated capacitor cell made by lamination of a plurality of capacitor unit cells having two activated carbon powder electrodes and sulfuric acid solution;

a housing configured to house the laminated capacitor cell, the housing being made of a functionally graded aluminum-ceramic material; and at least one mounting portion configured to mount the electric double layer capacitor on another device, the mounting portion and the housing being formed in one piece.

14. An anti-lock brake system according to claim 13, wherein:

the electric double layer capacitor includes a plurality of mounting portions;

the housing has a rectangular parallelepiped shape;

the plurality of mounting portions are installed at the bottom of the housing;

the plurality of mounting portions and the housing are formed in one piece;

the plurality of mounting portions are installed in a zigzag pattern or randomly;

the housing is electrically insulated from the electrodes; and the electrodes are located at one plane of the housing.

15. An anti-lock brake system according to claim 13, wherein:

the plurality of capacitor unit cells are serial-connected to each other through electricity;

the output voltage of the laminated capacitor cell is in the range of 15-60 V DC; and the capacitance of the laminated capacitor cell is in the range of 1-100 F.

16. An anti-lock brake system according to claim 13, wherein the electric double layer capacitor further comprises an LED display for displaying output voltage and remaining capacitance of the electric double layer capacitor.

17. An anti-lock brake control method for vehicles including (A) an anti-skid valve having (A-1) a two-way valve comprising a first pilot valve whose operation mode is normally-open or normally-closed and a first main valve whose operation mode is different from that of the first pilot valve and (A-2) a three-way valve connected serially to the two-way valve comprising a second pilot valve whose operation mode is normally-open or normally-closed and a second main valve whose operation mode is different from that of the first pilot valve, (B) a plurality of wheels, and (C) an actuator for applying braking force to the plurality of wheels, the method comprising:

generating braking force;

calculating a parameter showing whether a wheel is skidding;

determining whether the parameter exceeds a predetermined value;

outputting during a first predetermined duration a first signal for causing the first pilot valve to be de-energized and the second pilot valve to be energized when the parameter is determined to exceed the predetermined value;

outputting during a second predetermined duration a second signal for causing the first pilot valve to be energized and the second pilot valve to be de-energized after the outputting of the first signal is finished;

outputting a third signal for causing both the first pilot valve and the second pilot valve to be de-energized after the outputting of the first signal is finished when the parameter is determined not to exceed the predetermined value.

* * * * *

UNITED STATES PATENT AND TRADEMARK OFFICE
CERTIFICATE OF CORRECTION

PATENT NO. : 7,350,880 B2
APPLICATION NO. : 11/348436
DATED : April 1, 2008
INVENTOR(S) : Kiyoshi Kawaguchi et al.

It is certified that error appears in the above-identified patent and that said Letters Patent is hereby corrected as shown below:

Title Page, (73) Assignee:, before "NEC Tokin Corporation (JP)" insert --Railway Technical Research Institute (JP); Shinko Electric Co., LTD. (JP); Kayaba Industry Co., LTD. (JP); Taco Co., LTD. (JP);--

Column 6, Line 50, after "with" delete "and"

Column 8, Line 52, "11" should be --11.--

Column 8, Line 64, "Pressure" should be --pressure--

Column 8, Line 65, "Pressure" should be --pressure--

Column 8, Line 67, "51" should be --51.--

Column 9, Line 1, "breaking" should be --braking--

Column 9, Line 12, "breaking" should be --braking--

Column 9, Line 15, "breaking" should be --braking--

Column 9, Line 19, "breaking" should be --braking--

Column 9, Line 20, "breaking" should be --braking--

Column 11, Line 35, "FIG." should be --FIGS.--

Column 11, Line 52, "correspondence" should be --accordance--

Column 12, Line 66, "Separator" should be --separator--

Column 14, Line 13, "breaking" should be --braking--, both occurrences

Column 14, Line 19, "breaking" should be --braking--, both occurrences

Column 14, Line 25, "breaking" should be --braking--

Column 14, Line 52, "Breaking" should be --Braking--

Column 14, Line 64, "breaking" should be --braking--

Column 15, Line 22, "Breaking" should be --Braking--

Column 15, Line 41, "breaking" should be --braking--

UNITED STATES PATENT AND TRADEMARK OFFICE
CERTIFICATE OF CORRECTION

| | |
|---|---|
| PATENT NO. | : 7,350,880 B2 |
| APPLICATION NO. | : 11/348436 |
| DATED | : April 1, 2008 |
| INVENTOR(S) | : Kiyoshi Kawaguchi et al. |

It is certified that error appears in the above-identified patent and that said Letters Patent is hereby corrected as shown below:

Column 15, Line 44, "Breaking" should be --Braking--

Column 15, Line 63, "breaking" should be --braking--

Column 15, Line 66, "breaking" should be --braking--

Column 16, Line 1, "Breaking" should be --Braking--

Column 16, Line 14, "breaking" should be --braking--

Column 16, Line 16, "breaking" should be --braking--

Column 16, Line 19, "14,B." should be --14B.--

Column 16, Line 21, "breaking" should be --braking--

Column 16, Line 22, "breaking" should be --braking--

Column 16, line 26, "breaking" should be --braking--

Column 16, Line 31, "breaking" should be --braking--

Column 17, Lines 18-19, "over discharged," should be --over-discharged,--

Column 17, Line 21, "over discharged." should be --over-discharged.--

Column 18, Line 32, "breaking" should be --braking--

Column 18, Line 33, "breaking" should be --braking--

Column 18, Line 40, "11" should be --11.--

Column 18, Line 41, "breaking" should be --braking--

Column 18, Line 45, "breaking" should be --braking--

Column 18, Lines 53-54, "breaking" should be --braking--

Column 18, Line 54, "breaking" should be --braking--

Column 18, Line 58, "breaking" should be --braking--

Column 18, Line 61, "breaking" should be --braking--

Column 18, Line 67, "breaking" should be --braking--

UNITED STATES PATENT AND TRADEMARK OFFICE
CERTIFICATE OF CORRECTION

PATENT NO. : 7,350,880 B2
APPLICATION NO. : 11/348436
DATED : April 1, 2008
INVENTOR(S) : Kiyoshi Kawaguchi et al.

It is certified that error appears in the above-identified patent and that said Letters Patent is hereby corrected as shown below:

Column 19, Line 1, "breaking" should be --braking--

Column 20, Line 23, "breaking" should be --braking--

Column 20, Line 25, "breaking" should be --braking--

Signed and Sealed this

Twenty-fourth Day of March, 2009

JOHN DOLL
*Acting Director of the United States Patent and Trademark Office*